(12) United States Patent
Desai et al.

(10) Patent No.: US 7,739,030 B2
(45) Date of Patent: Jun. 15, 2010

(54) RELIEVING URBAN TRAFFIC CONGESTION

(76) Inventors: Shitalkumar V. Desai, 5708 Tribune Way, Plano, TX (US) 75094;
Vipinchandra M. Desai, 5708 Tribune Way, Plano, TX (US) 75094

(*) Notice: Subject to any disclaimer, the term of this patent is extended or adjusted under 35 U.S.C. 154(b) by 0 days.

(21) Appl. No.: 12/167,030

(22) Filed: Jul. 2, 2008

(65) Prior Publication Data
US 2009/0125160 A1 May 14, 2009

Related U.S. Application Data

(60) Provisional application No. 60/987,449, filed on Nov. 13, 2007.

(51) Int. Cl.
*G08G 1/07* (2006.01)
*E01F 9/087* (2006.01)
(52) U.S. Cl. .......................... 701/117; 340/907; 404/12
(58) Field of Classification Search ................. 701/117; 340/907; 404/12
See application file for complete search history.

(56) References Cited

U.S. PATENT DOCUMENTS

| | | | |
|---|---|---|---|
| 2,931,279 A * | 4/1960 | Wiswell | 404/13 |
| 3,263,578 A * | 8/1966 | Pilcher | 404/13 |
| 3,541,962 A | 11/1970 | Avery | |
| 3,593,261 A * | 7/1971 | Dominguez | 340/907 |
| 3,847,496 A | 11/1974 | Stankiewicz | |
| 4,003,443 A | 1/1977 | Boughers | |
| 4,020,914 A | 5/1977 | Trautwein | |
| 4,064,957 A | 12/1977 | Parham | |

(Continued)

OTHER PUBLICATIONS

*Urban Mobility Report*, Texas Transportation Institute, http://tti.tamu.edu/documents/ums/mobility_report_2005_wappx.pdf.

(Continued)

*Primary Examiner*—Thomas G Black
*Assistant Examiner*—Shelley Chen
(74) *Attorney, Agent, or Firm*—Moore Patents; David Dreyfuss

(57) ABSTRACT

A method of reducing congestion on a roadway is disclosed comprising dividing selected lengths of selected normal lanes of a roadway into two commuter lanes, providing distinctive lane markings to identify the commuter lanes, and dynamically designating selected lengths of selected lanes as either normal lanes or pairs of commuter lanes. In order to dynamically change lane configurations, a set of indicators can be provided as lane markers together with a control system to alter particular lane configurations between normal lanes and commuting lanes both cyclically according to a preprogrammed schedule and dynamically in response to sensed vehicle traffic volume, unusual events such as accidents, weather, and so on. Commuter lanes are designated cyclically and dynamically in response to traffic conditions to increase the capacity of the affected road. Normal lanes are designated at other times. To facilitate entry and exit from designated commuter lanes, transition zones can be provided where entering and exiting commuter lane traffic has right of way.

A commuter vehicle is disclosed for use on commuter lanes. A typical commuter vehicle weighs less than 650 lbs., has at least three wheels, an enclosed seating compartment, and a low center of gravity with at least one occupant. In one embodiment, occupants sit in a near-kneeling position to lower their center of gravity. In, an alternate embodiment also providing a low center of gravity, occupants sit in a recumbent position. A mechanism can be provided to raise and lower the seats to facilitate occupant entry and exit. Occupants can be position in-line, one behind the other. Embodiments with two, three, or more seats can be provided.

20 Claims, 15 Drawing Sheets

U.S. PATENT DOCUMENTS

| | | |
|---|---|---|
| 4,065,144 A | 12/1977 | Winchell |
| 4,283,074 A | 8/1981 | Tidwell |
| 4,313,517 A | 2/1982 | Pivar |
| 4,484,648 A | 11/1984 | Jephcott |
| 4,500,225 A * | 2/1985 | Quittner .................. 404/6 |
| 4,624,601 A * | 11/1986 | Quittner .................. 404/12 |
| 4,690,583 A * | 9/1987 | Faulconer ................ 404/6 |
| 5,006,010 A * | 4/1991 | Duckett .................. 404/12 |
| 5,289,183 A | 2/1994 | Hassett et al. |
| 5,470,171 A * | 11/1995 | Tseng .................... 404/13 |
| 5,862,509 A * | 1/1999 | Desai et al. ............. 701/209 |
| 5,917,432 A * | 6/1999 | Rathbone ................ 340/907 |
| 5,921,701 A | 7/1999 | Clayton |
| 6,276,542 B1 | 8/2001 | McCrary |
| 6,305,874 B1 * | 10/2001 | Custers et al. ............ 404/9 |
| 6,328,121 B1 * | 12/2001 | Woodbury et al. ......... 180/65.1 |
| 6,556,916 B2 * | 4/2003 | Waite et al. ............. 701/117 |
| 6,694,247 B2 | 2/2004 | Hameleers et al. |
| 6,789,915 B2 * | 9/2004 | Van Der Poel et al. ... 362/153.1 |
| 7,021,857 B2 * | 4/2006 | Van Der Poel ............ 404/9 |
| 7,025,525 B2 * | 4/2006 | Van Der Poel ............ 404/1 |
| 7,155,376 B2 * | 12/2006 | Yang et al. .............. 703/8 |
| 2003/0060969 A1 * | 3/2003 | Waite et al. ............. 701/117 |
| 2004/0091313 A1 * | 5/2004 | Zhou .................... 404/1 |

OTHER PUBLICATIONS

*Performance Measure Summary*, Texas Transportation Institute, http://mobility.tamu.edu/ums/congestion_data/tables/dallas.pdf.

Koepp, Stephen, "Gridlock" *Time Magazine*, Sep. 12, 1988.

* cited by examiner

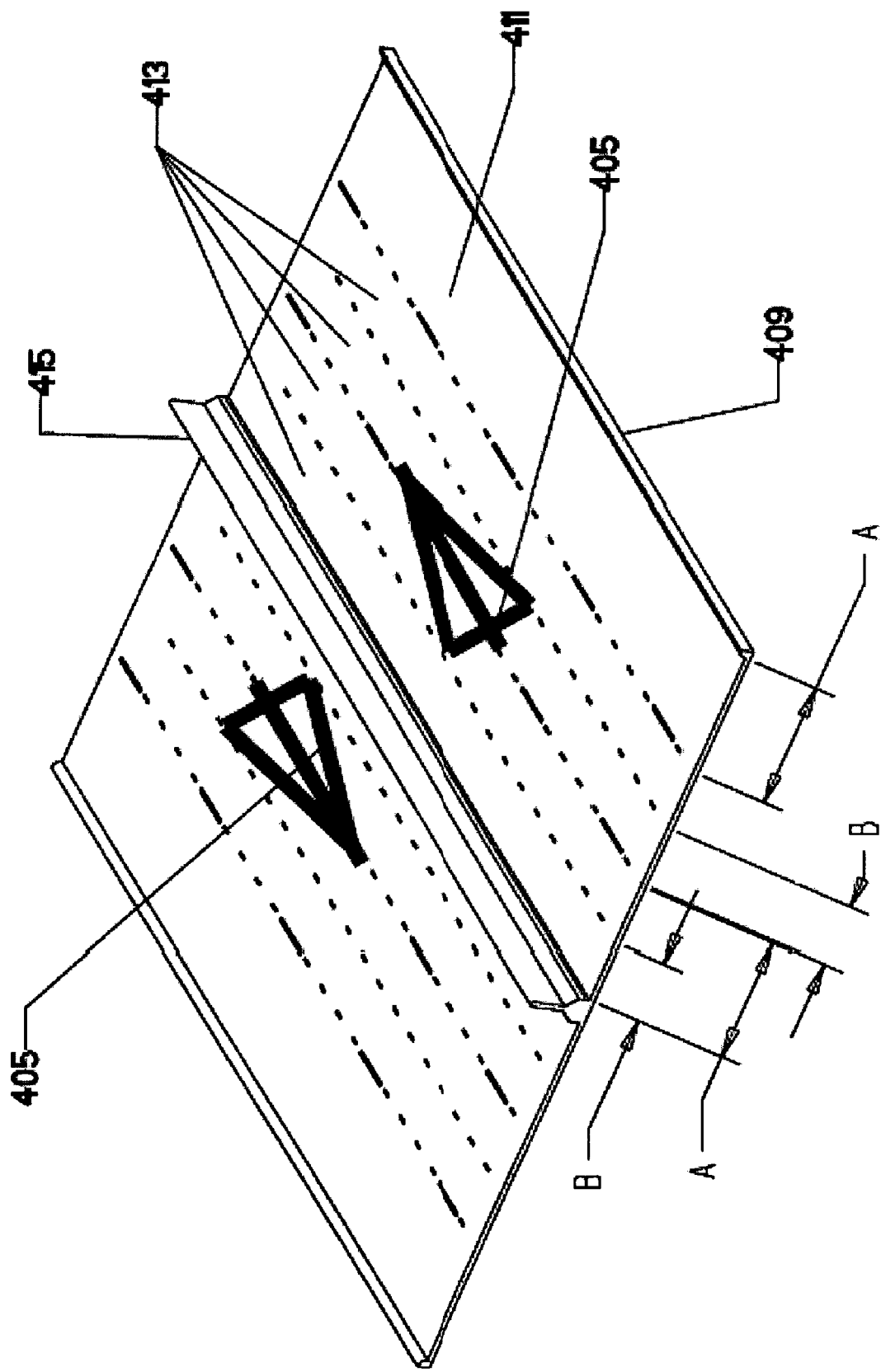

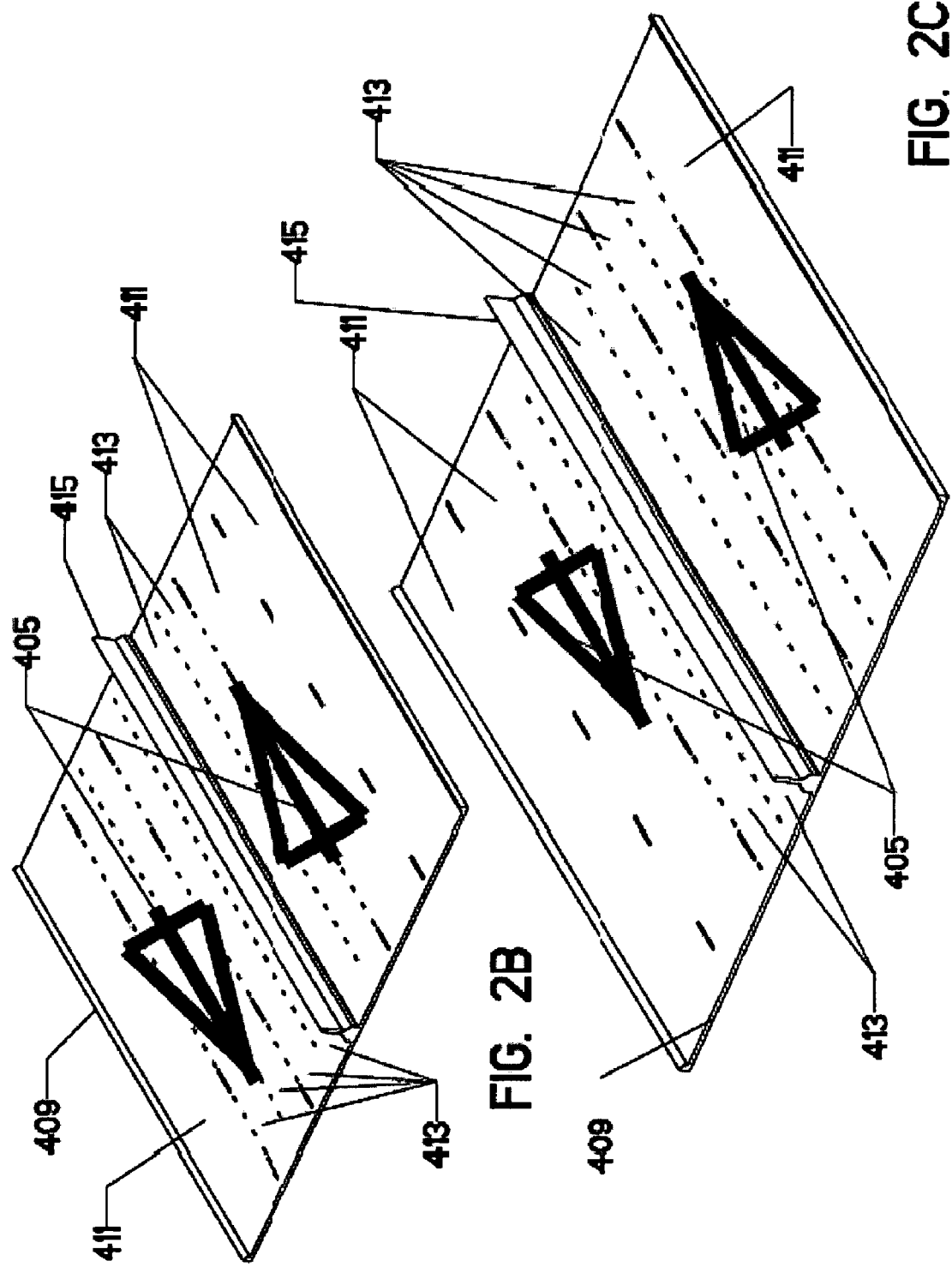

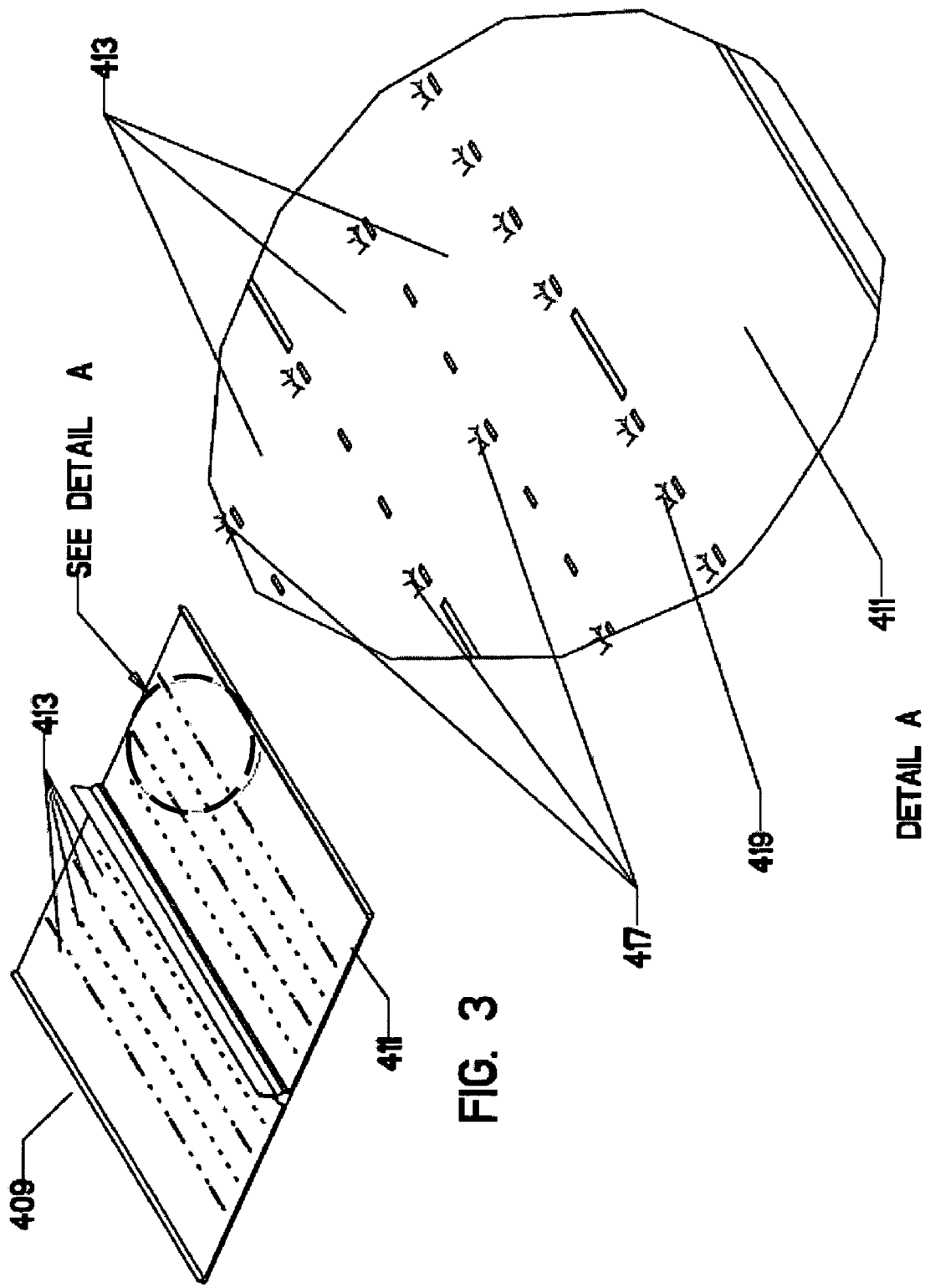

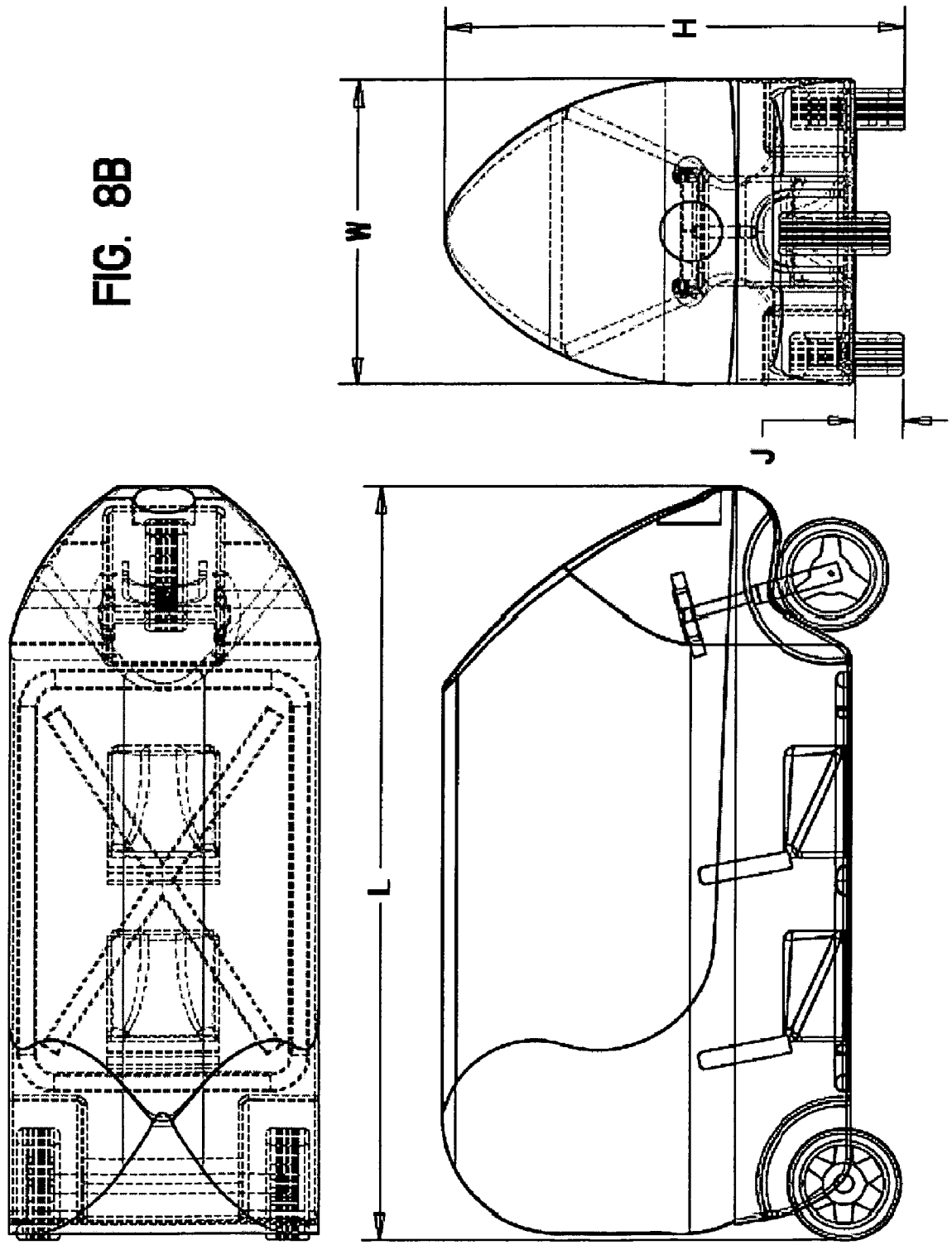

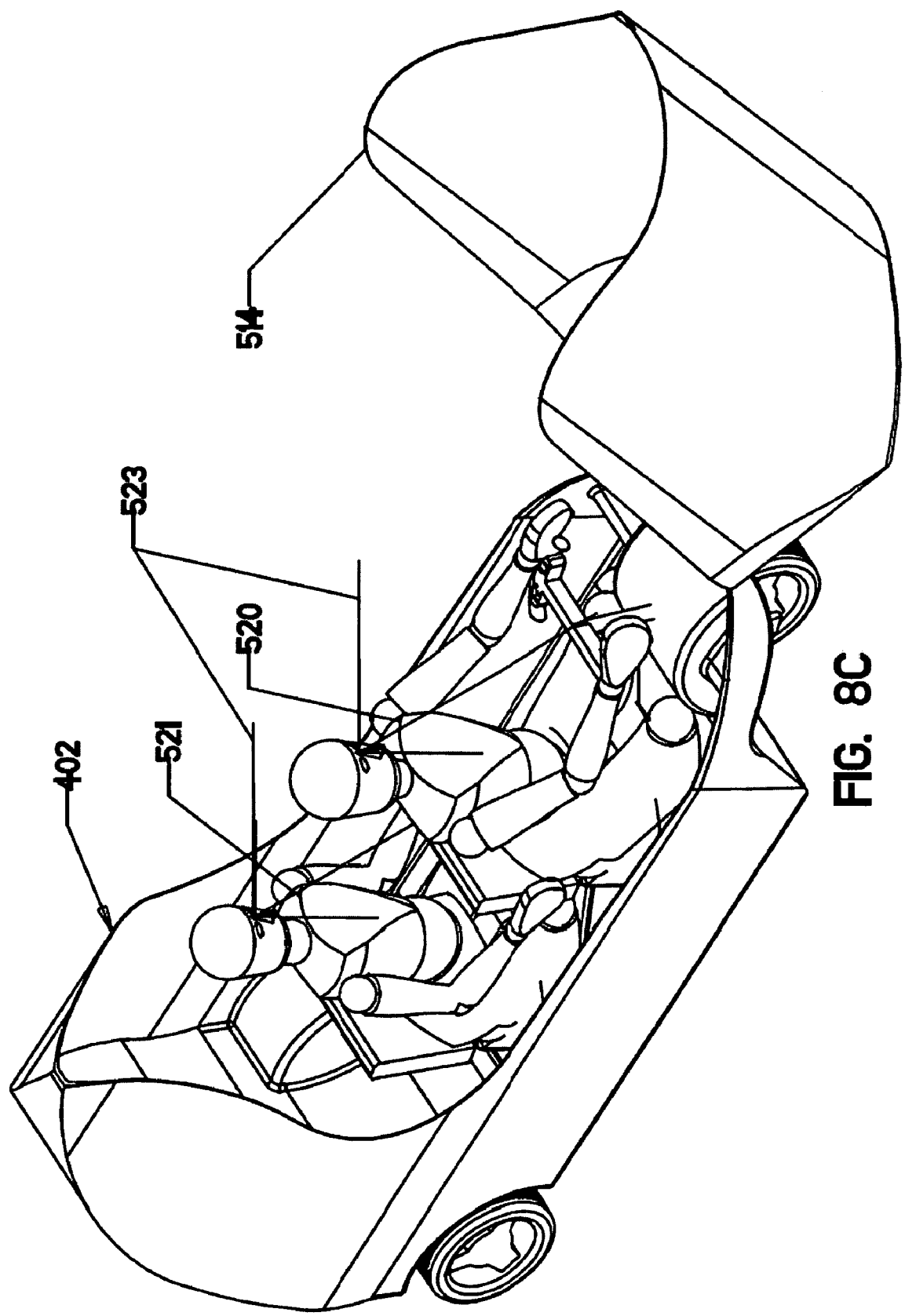

RELIEVING URBAN TRAFFIC CONGESTION

CROSS REFERENCE TO RELATED APPLICATIONS

This application claims priority to U.S. Provisional Application No. 60/987,449, filed on Nov. 13, 2007, incorporated by reference herein in its entirety.

FIELD OF THE INVENTION

The present invention generally relates to methods and vehicles for reducing urban traffic congestion.

BACKGROUND OF THE INVENTION

A record 9.16 million barrels per day of motor gasoline was consumed in 2005. The average price of a gallon of gasoline in the United States is approaching four dollars as of June 2008.

Traffic data presented in the 2005 annual *Urban Mobility Report* by the Texas Transportation Institute at Texas A&M University for peak commuting hours in 85 metropolitan areas in 2005, when the average price of gasoline was $1.45 per gal, showed an annual total of 3.7 billion hours of delay, 2.3 billion gallons of extra fuel used and a total cost of $63.1 billion per year. About 70% of this cost is from fuel costs, so at $4 per gal, this total cost is now at least $140 billion, an amount which, if it were the revenues of a company, would put it among the ten largest companies in the United States.

In general, traffic congestion is worse in larger urban areas than in smaller ones. Traffic congestion levels have increased in every area since 1982. Congestion extends to more times of the day and more roads, affects more travel, and creates more extra travel time than in the past. Congestion levels have risen in all urban size categories, indicating that even smaller areas are not able to keep pace with rising demand. The need for attention to transportation projects is illustrated in these trends. However, major transportation projects require a significant planning and development time—10 years is not an unrealistic timeframe to go from an idea to a completed project or to an accepted program. At recent growth rates, the average congestion for medium-sized urban areas in 2013 will have the congestion problems of large areas in 2003.

Congestion travel time penalties are related to size of the area. The delay per traveler increases with population, but there is a significant amount of variation within groups. Areas that have seen high rates of growth in recent years are more likely to be near the top of their population group because demand has increased much faster than the corresponding increase in roadway capacity, public transportation services, traffic control infrastructure, and land use patterns.

The *Urban Mobility Report* shows that:
Areas with populations over 3 million (Very Large) can expect a minimum annual delay per traveler of 38 hours;
Areas with populations over 1 million (Large and Very Large) can expect a delay per traveler of at least 10 hours with a more likely value of around 37 hours;
Areas with populations over 0.5 million (all except Small) should expect at least 7 hours with typical values being closer to 20 to 30 hours; and
Areas with populations less than 0.5 million (Small) should expect a delay per traveler of up to 25 hours.

Traffic congestion affects a broader segment of the transportation system each year. Congestion has spread to more cities, more of the road system, more trips within a given city, more time during the day, and more days of the week in some locations. Comparing 1982 to 2005, the *Urban Mobility Report* finds that:
28 urban areas had a Travel Time Index above 1.30 in 2003 compared with only one such area in 1982;
67% of the peak period travel was congested in 2003 compared to 32% in 1982;
59% of the major road system was congested in 2003 compared to 34% in 1982;
The number of hours of the day when congestion might be encountered grew from about 4.5 hours to about 7.1 hours; and
Most of the trend information indicates that the 2003 average values for each population group are near the 1990 value for the next highest population group. This is also the case for the 1990 and 1982 comparison. This suggests that each group will attain congestion levels of the next higher group approximately each decade if trends are not reversed.

The *Urban Mobility Report* also gives the cost per traveler for each population group as reproduced in Table 1.

TABLE 1

Congestion Effects on the Average Traveler in 2003

| Population group | Average cost per traveler | Average delay per traveler (hrs) | Average fuel used per traveler (gal) |
|---|---|---|---|
| Very large | $1,038 | 61 | 36 |
| Large | $620 | 37 | 23 |
| Medium | $418 | 25 | 15 |
| Small | $222 | 13 | 8 |
| Average for 85 areas | $794 | 47 | 28 |

How much more transportation capacity would be needed to alleviate congestion? This is a difficult question to answer. Most urban areas implement a wide variety of projects and programs to deal with traffic congestion. Each of these projects or programs can add to the overall mobility level for the area. Thus, isolating the effects of roadway construction is difficult, because these other programs and projects make a contribution at the same time. In any case, the relevancy of the analysis is questionable. Many areas focus on managing the growth of congestion, particularly in rapid-growth areas. The analysis presented in the *Urban Mobility Report* is not intended to suggest that road construction is the best or only method to address congestion. It also concludes that it would be almost impossible to attempt to maintain a constant congestion level with road construction only. Over the past two decades, only about 50% of the needed mileage was actually added. This means that it would require at least twice the level of current road expansion funding to attempt a road-construction-only strategy. An even larger problem would be to find suitable roads that can be widened, or areas where roads can be added, year after year. Most urban areas are pursuing a range of congestion management strategies, with road widening or construction being only one.

How many new carpools or bus riders would be needed if that were the only solution? The *Urban Mobility Report* shows the increase in occupancy level in order to maintain existing congestion levels and concludes that the aforementioned 85 urban areas added more than 52 million additional miles of daily person travel in 2003. To accomplish a goal of maintaining a constant congestion level in these areas by only adding transit riders and carpoolers, there would have to be a substantial growth in these modes. The growth would be equivalent to an additional 3-4% of all vehicles becoming carpools, or expanding transit systems by more than one-third of the current ridership each year. It may be very difficult to convince this many people to begin ridesharing or using public transit. There has been some success with this solution, and in conjunction with other techniques, there may be some opportunity to slow the mobility decline.

The above summary of data and conclusions from the *Urban Mobility Report* clearly defines the urban mobility problem, its spread, cost, and possible solutions which have historically been considered. Solutions implemented and suggested to date are generally location specific, require heavy capital investment, involve lengthy temporary traffic diversion affecting traffic at all hours, cause additional temporary congestion during commuting hours, and are expensive. These solutions include building high-occupancy vehicle (HOV) lanes, new roads, or new lanes on existing roads, or alternatively building parallel rail lines, adding commuter buses, etc. Developed countries like the United States, could actually afford many of these suggested conventional solutions, although they would still suffer ongoing and worsened congestion until these high-capital-investment projects are completed. They would still be incurring financial loss of tens of billions of dollars per year until implementation is complete (assuming constant congestion, economic health, and stable fuel prices; we have already observed that congestion has gotten steadily worse every year since 1982).

In addition, the roadway improvement solutions mentioned above are not dynamic in the sense that new capacity would be available for both non-commute hours and commute hours. In effect, excess average capacity must be built to accommodate peak demand during commute hours.

Various proposals have been made to address these problems. Stankiewicz (U.S. Pat. No. 3,847,496) discloses an integrated highway, parking, and mass transit system. Avery (U.S. Pat. No. 3,541,962) teaches an urban aerial car transit system with overhead rails. Clayton (U.S. Pat. No. 5,921,701) teaches the building of a center-turning overpass. These proposals generally require very expensive infrastructure changes to the current road system; some of them can be implemented only in newly developing areas. In some urban areas both sides of the freeway are choked during peak commuting hours, and there is no space to expand the roadway or even to provide bypass routes during construction.

Hassett (U.S. Pat. No. 5,289,183) discloses automatic traffic monitoring. He proposes a variety of sensor means for detecting traffic conditions and therefore congestion, but does not provide means to relieve congestion.

Hameleers (U.S. Pat. No. 6,694,247) discloses flexible traffic management with real-time changes depending on real-time traffic information. The dynamic changes suggested include changes to speed limit, traffic signs, parking lanes, use of one or two lanes, etc.

Yang et al. (U.S. Pat. No. 7,155,376) discloses a traffic simulation system and methods for traffic analysis and traffic data management with geographic information. No methods of relieving congestion are provided.

*TIME Magazine*, Sep. 12, 1988, has a cover story about grid-lock. The article describes possible solution to the highway problem; however it indicates that automobile use is a valued personal liberty for U.S. residents and that they are not likely to abandon their automobile for use of mass transit.

Some commuters use cycles, motorcycles, and scooters to travel through congested traffic areas more easily than conventional vehicles. A conventional two-wheeled motorcycle or scooter seats one or two people on a narrow vehicle generally not more than 3 ft wide. They can often be observed to travel between lanes of stalled or slow traffic, although this is a dangerous practice. Two-wheeled vehicles are inherently unstable at very low speed and when stopped and provide little protection for the riders during minor accidents and bad weather.

Present enclosed-body vehicles, known or available in the U.S. market usually range from 66-78 inches in width. These vehicles generally have at least four wheels, with one or more rows of seats and each row with at least two seats. This minimum width is dictated in part for safety against rollover. Only one such vehicle can safely travel in the width of a normal lane—indeed lanes are designed to accommodate the width of these vehicles with a suitable safety margin from adjacent lanes.

Vehicles with narrow widths are known to achieve higher transportation efficiency with one or more people seating in tandem positions (one behind the other). Such narrow vehicles are susceptible to rollover unless specifically stabilized. Boughers (U.S. Pat. No. 4,003,443), Trautwein (U.S. Pat. No. 4,020,914), Parham (U.S. Pat. No. 4,064,957), and Winchell (U.S. Pat. No. 4,065,144) disclose such stabilizing devices using spring arrangements acting between the wheel suspension and the remainder of the vehicle. The vehicle always tends to return to its upright position. During normal operation, such vehicles could interfere with other vehicles around them which do not tilt in a similar manner.

Jephcott (U.S. Pat. No. 4,484,648) and Tidwell (U.S. Pat. No. 4,283,074) disclose vehicles arranged to bank, tilt, or roll toward the inside of a turn. The amount of roll required is dependent upon the speed and radius of the turn. This requires real-time processing of data, and the vehicle must be under precise electronic and hydraulic control. During normal operation, such vehicles could dangerously interfere with other vehicles around them, which do not tilt the same way. Also, the systems cause uneven tire wear and require careful maintenance, as failure of such systems can cause the vehicle to lose control. Manufacturing and maintenance costs are high.

McCrary (U.S. Pat. No. 6,276,542) discloses dual mode vehicles. These vehicles incorporate cruise control and automatic collision avoidance features for reduced commuting stress during normal road conditions and provide a manual mode when needed. Unfortunately, they do not reduce congestion.

Pivar (U.S. Pat. No. 4,313,517) discloses a three-wheeled vehicle with a low center of gravity (18 inches from ground with internal combustion engine and two 200-lb occupants) with side-by-side seating for two people that can make a 90°-turn with a radius of 47 ft at a speed of 13 mph. It has 30-50-mile range with battery-powered motor and top speed of 20 mph, so that it can never be a viable commuter vehicle for arterial streets and freeways, and it is not a narrow vehicle.

Woodbury (U.S. Pat. No. 6,328,121) discloses an ultra-narrow enclosed vehicle with a width of about 3 ft, stabilized with the aid of a ballast weight of 950 lbs, giving a curb weight of 1600 lbs. This ballast is the equivalent of about five extra passengers, and results in the need for a correspondingly larger engine or motor and higher fuel consumption.

Conventional means for reducing congestion include increasing the number of lanes, creating "high occupancy vehicle" (HOV) lanes, adding parallel rail transit, ride sharing, and public or private bus transport. All of these solutions suffer from one or many of the following drawbacks, including high capital investment, loss of usable lanes (e.g., underutilized HOV lanes), difficult to adapt to changing traffic demands, high operating costs (e.g., bus and rail systems that are not operating at full capacity, bus fuel and travel time inefficiencies and inflexibility when used in congested traffic). These solutions tend to be rigid and non-adaptable to the cyclic and dynamic conditions that are present on real roadways, and do not provide flexibility for commuters.

SUMMARY OF THE INVENTION

A method of reducing congestion on a roadway is disclosed comprising dividing selected lengths of selected normal lanes of a roadway into two commuter lanes, providing distinctive lane markings to identify the commuter lanes, and dynamically designating selected lengths of selected lanes as either normal lanes or pairs of commuter lanes. The method can be advantageously applied to any road subject to cyclic or dynamic congestion. In particular, the method is especially advantageous when applied to freeways and local arterial streets in urban areas.

In order to dynamically change lane configurations, a set of indicators such as flashing lights can be provided as lane markers together with a control system to alter particular lane configurations between normal lanes and commuting lanes both cyclically according to a preprogrammed schedule and dynamically in response to sensed vehicle traffic volume, unusual events such as accidents, weather, and so on. Commuter lanes are designated cyclically and dynamically in response to traffic conditions to increase the capacity of the affected road. Normal lanes are designated at other times. To facilitate entry and exit from designated commuter lanes, transition zones can be provided where entering and exiting commuter lane traffic has right of way.

While any narrow-width vehicle can be allowed to use designated commuter lanes, a special commuter vehicle can also be provided. A typical commuter vehicle weighs less than 650 lbs., has at least three wheels, an enclosed seating compartment, and a center of gravity with at least one occupant of less than about 13 inches above the ground. In one embodiment, occupants sit in a near-kneeling position to lower their center of gravity. In, an alternate embodiment also providing a low center of gravity, occupants sit in a recumbent position. A mechanism can be provided to raise and lower the seats to facilitate occupant entry and exit.

To minimize vehicle width, occupants can be positioned in-line, one behind the other. Embodiments with two, three, or more seats can be provided. All components of the vehicle should be kept within a 2.75 ft maximum width.

In certain embodiments all vehicle controls are operated by the driver's hands. Control configurations can be arranged so that both hands are required for normal driving, to discourage drivers from attempting to perform non-driving tasks while driving.

Commuter vehicles can be provided with a transparent canopy top which opens to the front or rear so that it never extends outside the 2.75 ft maximum width. Road reaction sensors can be provided on at least two wheels, and the sensors can be connected to a vehicle stability control unit (VSCU).

BRIEF DESCRIPTION OF THE DRAWINGS

FIG. 2A shows a perspective view of a portion of freeway with direction of traffic flow, lane dimensions and lane conversion.

FIG. 2B shows a perspective view of a portion of freeway with an unequal number of commuter lanes on each side of the freeway during morning peak commuting hours.

FIG. 2C shows a perspective view of a portion of freeway with an unequal number of commuter lanes on each side of the freeway during evening peak commuting hours.

FIG. 3 shows a perspective view with flashing light patterns A and B to be used on a typical freeway or local arterial street.

FIG. 8B shows side, top, and front views of a commuter vehicle with a canopy door.

FIG. 8C shows a perspective view of a commuter vehicle with two persons with an open canopy door.

DETAILED DESCRIPTION

Preliminary Tests

Figure 1A:
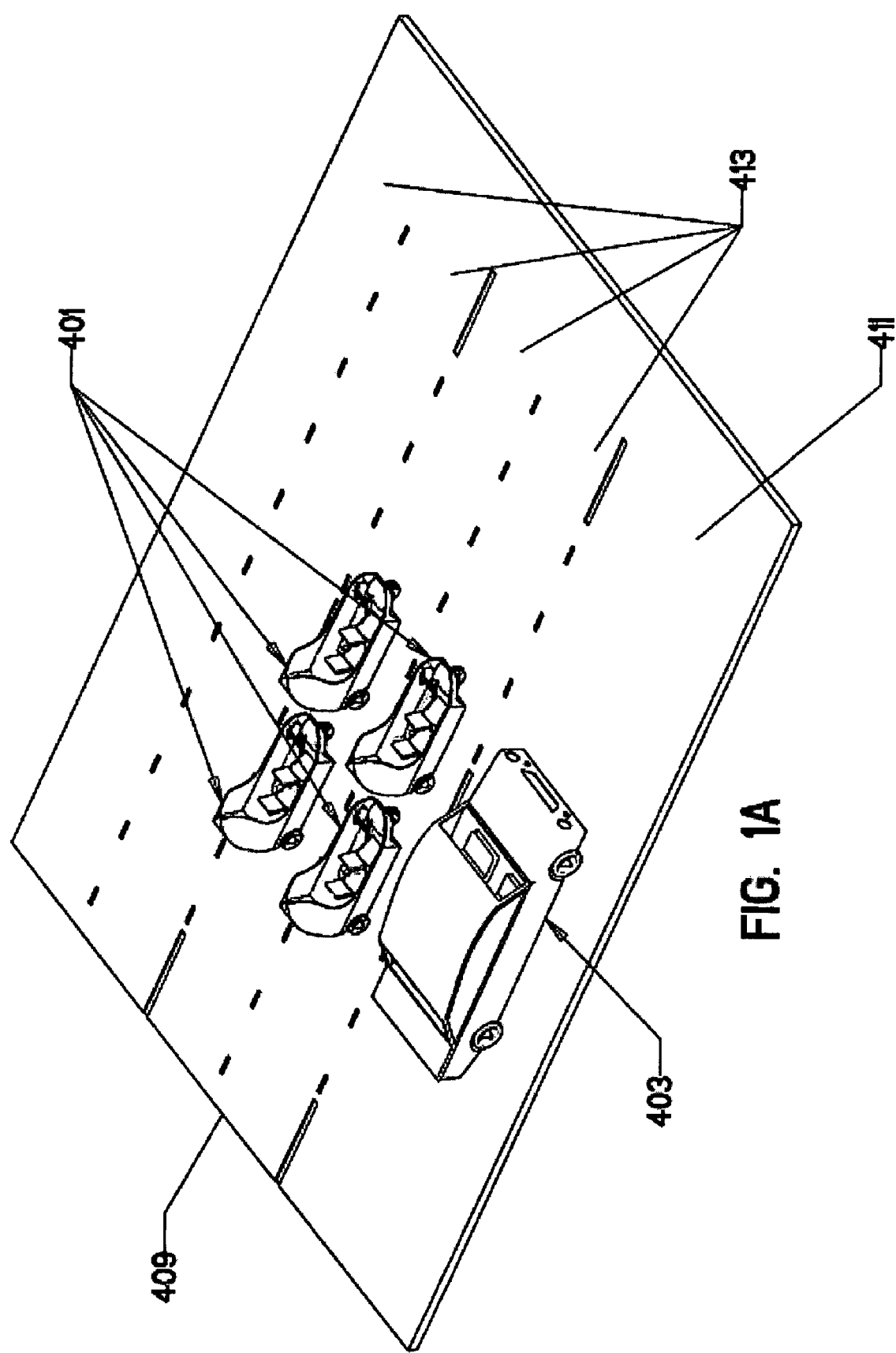
FIG. 1A shows a perspective view of a portion of three normal-width lanes, two of them converted to four commuter lanes. It also shows four commuter vehicles and one mid-size vehicle.

In order to understand the traffic congestion problem, three types of simple tests were conducted for both freeways and local arterial streets. The first test was a 92.5-mile round trip on weekdays and weekends, during different months and weather condition over a span of three years. The roads used were TX-190 (East-West) and I-35 (North-South). The travel times for over 300 round trips were measured. In the morning, the trip started between 6:25 am and 6:30 am, and the return trip in the afternoon started between 4:15 pm and 4:30 pm. The morning trip consistently required 43 to 47 min during weekdays. The return trip consistently required at least 63 min. There were occasional incidental delays caused by accidents, disabled vehicles, Oklahoma University game traffic, or severe weather. On weekends, the trips consistently required 43 to 47 min each way.

The second test was a 32-mile round trip on local arterial streets with three lanes on each side. The road had a posted speed limit of 40 mph. There were 32 to 34 traffic signal lights for the round trip. The travel times for over 100 round trips were measured. The trip was tested for various start times between 6:00 am and 8:45 am and return times between 4:30 pm and 6:30 pm. The route included three school zones. It was consistently found that the minimum trip time was about 40 min. It was observed that if at any time during the trip, a school zone was encountered and reduced speed limits were in effect (between 7:30 am and 9:00 am or 2:30 pm and 4:30 pm), an additional delay of 10 to 12 min per school zone occurred. The evening return trip consistently took about 50 min. Vehicle idling at intersections was required approximately every half mile.

The third test was a 100-mile round trip starting in the evening between 5:00 pm and 5:30 pm with a return trip starting between 10:00 pm and 10:15 pm. The roads used were US-75 (North-South), US-635 (East-West), TX-183 (East-West), TX-360 (North-South). The travel times for over 20 round trips were measured. The return trip never encountered congestion and took between 50 and 55 min. When the outbound trip started at 5:00 pm, it took 30 min more than when it started at 5:30 pm. Starting at 5:30 pm, the outbound trip consistently took about 75 min, giving a delay of 20 to 25 min due to peak commuting hour congestion.

Observations From the Experiments:
1. The major contributor to delay on the freeway during peak commuting hours was the presence of too many vehicles for the capacity of the road at certain entry and exit points. There were also slowdowns at certain curves in the road;
2. Even during peak commuting hours, there are some time slots that are better than others to reduce individual vehicle delay times;
3. During peak commuting hours, the HOV lane was generally underutilized, operating at about 25% of capacity;
4. The major contributions to local arterial street commute delays included: waiting at signal lights with improper synchronization every half mile, acceleration, deceleration, and overcrowding at certain major intersections;
5. Some busy local road intersections become congested easily because they have no or inadequate left and right turn bays, which, in turn, affects the adjacent non-turning lanes, leading to acute congestion during peak commuting hours;
6. On freeways, when there is no traffic congestion, vehicles, on average, travel at 10-15 mph over the posted speed limits; on local arterial streets, they travel at 5-7 mph over the posted speed limits;
7. There is a rapid increase in the density of vehicles on road following any congestion-triggering mechanisms, such as sudden braking, slowdowns due to exiting or entering vehicles, sudden lane change, slowdown of turning vehicles and vehicles leaving the roadway, slowdown or sudden braking due to inattentive driving (because of cell phone usage, eating while driving, shaving or applying make-up while driving, or talking or playing with other occupants of the vehicle).

Data compiled by the Texas Transportation Institute (TTI) (http://mobility.tamu.edu/ums/congestion_data/tables/dallas.pdf) show similar trends for the Dallas metropolitan area as a whole. The three experiments described above showed significantly above-average delays compared to the TTI data. Congestion in Dallas has been increasing steadily, and this trend is continuing, as sufficient new capacity in the form of either additional lane-miles or additional public transit usage to keep pace with the likely growth in commute volume is not planned or projected and would take many years to build even if funded immediately.

From a purely financial point of view, it is not economically feasible to invest huge sums of capital to build, for example, six lanes on either side of a freeway, when two or three lanes are enough during non-peak commuting hours. Peak commuting hours in very large metropolitan areas are typically from 6:00 am to 9:00 am and 4:00 pm to 7:00 pm, i.e., 6 hours out of 24 hours per weekday, or 25% of weekday time. The same roads have excess capacity during non-peak times in most cases. Thus the problem is cyclic (repeating with a similar pattern on a daily schedule) and dynamic (constantly changing with respect to time and place) in nature. Conventional solutions are neither cyclic nor dynamic and are ineffective, at least in part, because of this deficiency.

Definitions

Before the present invention is described in detail, it is to be understood that, unless otherwise indicated, this invention is not limited to specific embodiments as such may vary. It is also to be understood that the terminology used herein is for the purpose of describing particular embodiments only and is not intended to limit the scope of the present invention.

It must be noted that, as used herein and in the claims, the singular forms "a," "an" and "the" include plural referents unless the context clearly dictates otherwise. Thus, for example, reference to "a lane" includes two or more lanes; reference to "a vehicle" includes two or more vehicles, and so forth.

References to masculine pronouns such as "he" or "his" or similar are understood to be used with the generic meaning (e.g., "he" means "he or she"; "his" means "his or her").

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges can independently be included in the smaller ranges, and are also encompassed within the invention, subject to any specifically excluded limit in the stated range. Where the stated range includes one or both of the limits, ranges excluding either or both of those included limits are also included in the invention.

Specific words and phrases are generally used herein with their common English meaning as appropriate to the local context. Specific important words and phrases are further clarified as follows:

Roadway: the part of a road which is used by vehicles. The roadway is divided into one or more lanes of traffic.

Freeway: a limited access road designed for high speed travel.

Arterial street: a road in an urban area designated for through traffic.

Normal lane: a lane of sufficient width for most common vehicles. A width of 12 ft is common in the U.S., but narrower and wider lanes exist.

Commuter lane: a lane that is sufficiently narrow that two commuter lanes can be created in the space of one normal lane. Typically, each lane is half the width of a normal lane, but unequal divisions are also possible. Each lane must be wide enough to enable use by available narrow-width vehicles.

Transition zone: a length of lane marked to indicate that commuter traffic may be entering or exiting commuter lanes. An example marking is a set of diagonal white stripes ("zebra" stripes). Conventional vehicles driving in a transition zone are expected to yield right of way to commuter vehicles entering or exiting the commuter lanes.

Commuter vehicle: a vehicle which is narrow enough to be wholly contained within a commuter lane plus additional clearance on each side as required by the local transportation authority. Typically, a commuter vehicle has no projections beyond a 2.75-ft maximum width, but if local lane widths allow, wider vehicles are also possible.

Near-kneeling position: a seating position wherein the feet are facing toward the rear of the person, and the person is generally positioned with an upright spine but otherwise as low as possible with the knees bent more than 90°.

Recumbent position: a seating position wherein the feet are toward the front and the knees are nearly straight.

Commuter Vehicles and Commuter Lanes

Accordingly, the present invention provides a method of decreasing congestion in urban areas that is both cyclic and dynamic, requires modest capital investment, and can be implemented on a short time schedule. The real cause of congestion is that the density of vehicles on a given road at peak hours is too high, and there is not enough capacity left for additional vehicles to enter the same road system during commuting hours. The present invention allows vehicles and roadways to adapt to each other cyclically and dynamically to reduce or eliminate congestion. Further, due to the relatively small incremental cost of implementing the methods disclosed herein, the methods also provide flexibility to choose which sections of freeway and roadway use the methods in a way that responds promptly to changing usage patterns without years of study, planning, and construction.

A narrow commuter vehicle is provided together with methods for increasing the density of such vehicles on a freeway or arterial street. Embodiments of the methods and commuter vehicle are shown in FIGS. 1-7 and FIGS. 8-9 respectively.

Figure 1B:
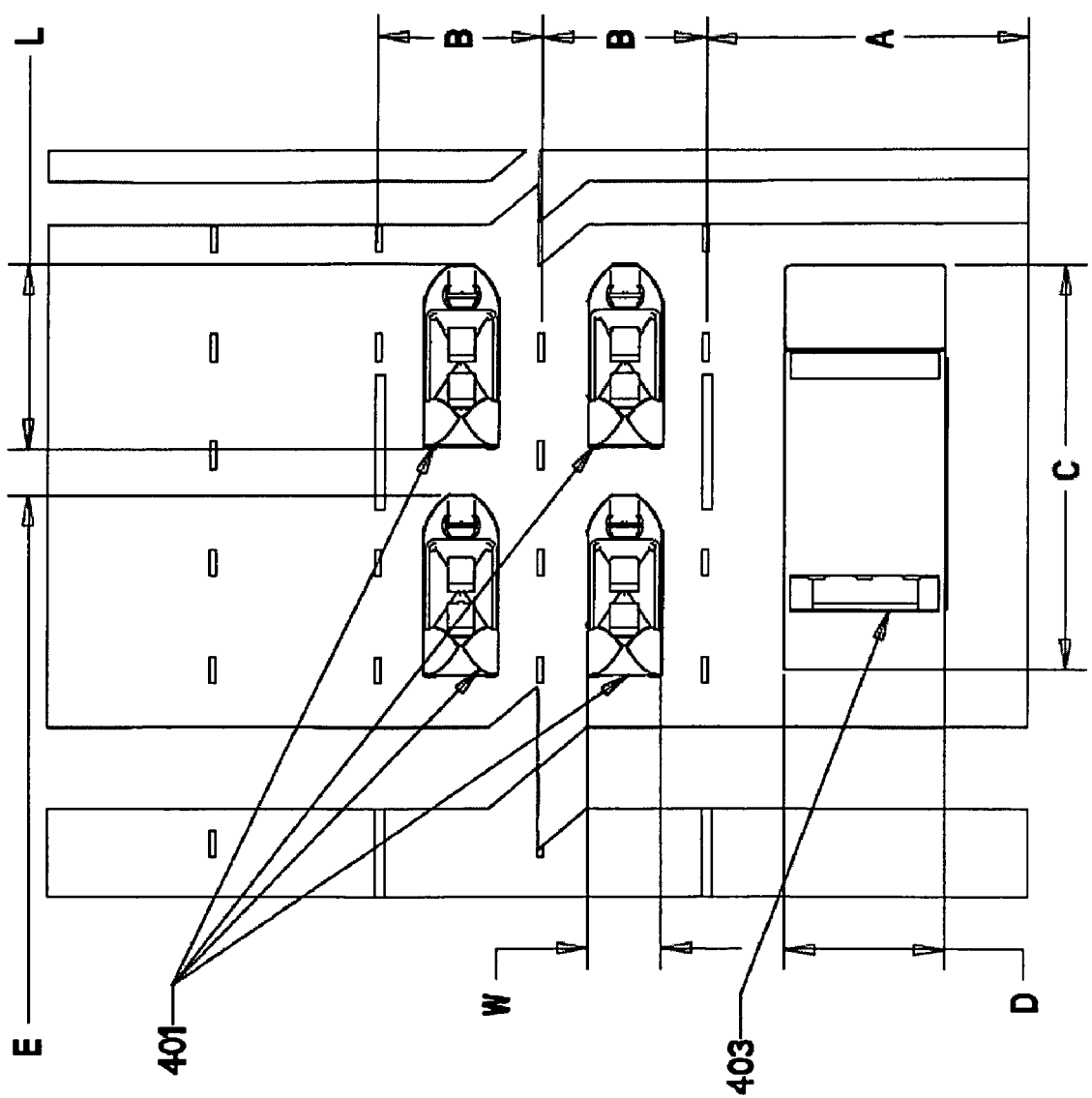
FIG. 1B shows a top view of the same scene as FIG. 1A with various dimensions labeled. It also shows graphically how over four commuter vehicles can fit in the space of one mid-size conventional automobile.

FIG. 1A shows a perspective view and size comparison of a mid-size sedan 403 with four commuter vehicles 401 in adjacent lanes. It also shows one side of a freeway 409 with a normal width lane 411, and four commuter lanes 413. FIG. 1B shows a top view of the same vehicles and lanes with various dimensions. For example, common freeway lanes have lane width A=12 ft; commuter lane widths can be set to half this width, B=6 ft; a mid-size sedan has a typical length C=15 ft and width D=5.88 ft; in this embodiment, the commuter vehicles can have length L=6.75 ft and width W=2.75 ft, with a spacing at rest E=1.5 ft. Other configurations are also possible but not illustrated. For example, unequal division of normal lanes into commuter lanes can be provided, especially if normal lanes are larger. A 13-foot-wide normal lane on an arterial street can be divided into an 8-foot-wide lane and a 5-foot-wide lane. The 5-foot-wide lane can be restricted to scooters and small motorcycles while the 8-foot-wide lane can be restricted to vehicles of less than 4.75 ft in width.

FIGS. 2A, B, and C show a portion of a freeway 409 with direction of traffic flow arrow 405, one normal-width lane 411 and commuter lanes 413. FIG. 2B shows a greater number of commuter lanes on one side of the road than on the other during morning commuting hours, while FIG. 2C shows the reverse lane allocation for evening commuting hours. The unequal number of commuter lanes is because of unequal traffic demand on one side compared to the other, during morning and evening commuting hours.

FIG. 3 shows a portion of a freeway 409, with normal-width lanes 411, commuter lanes 413. Detail A shows flashing lights 417 in pattern A (which is between two adjacent commuter lanes), and flashing lights 419 in pattern B (which is between a commuter lane and adjacent normal width lane).

Figure 4:
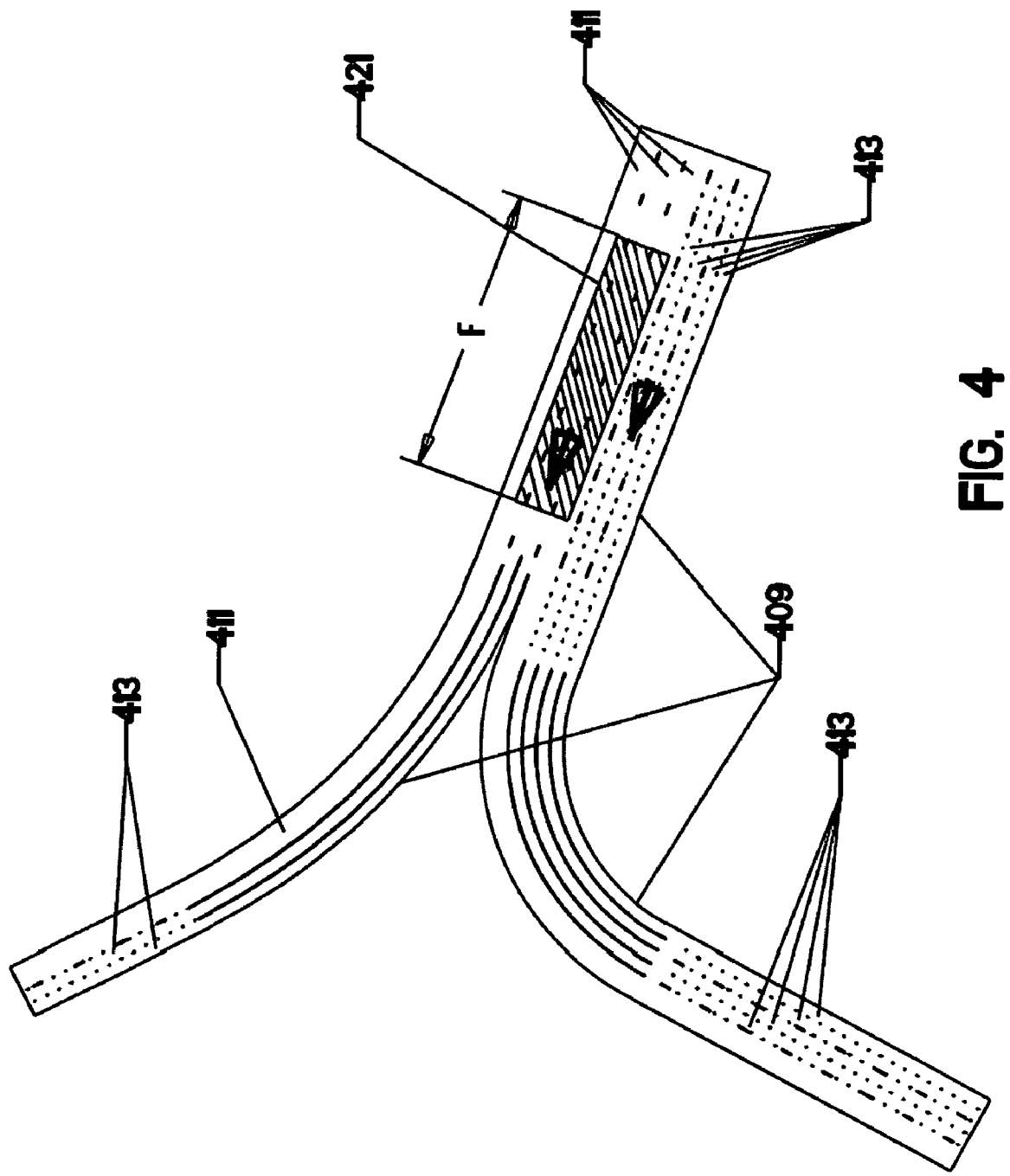
FIG. 4 shows a top view of a freeway split with an unequal number of commuter lanes with an entry and exit patch for changeover lanes.

FIG. 4 shows a top view of a portion of a freeway 409 with different numbers of normal-width lanes 411 and commuter lanes 413, and a transition zone 421 which can be of dimension F=0.25 miles to facilitate safe changeover from normal lanes to commuter lanes or vice-versa. The left-bound roadway has one normal-width lane and four commuter lanes while the right-bound roadway has one normal-width lane and two commuter lanes.

Figure 5A:
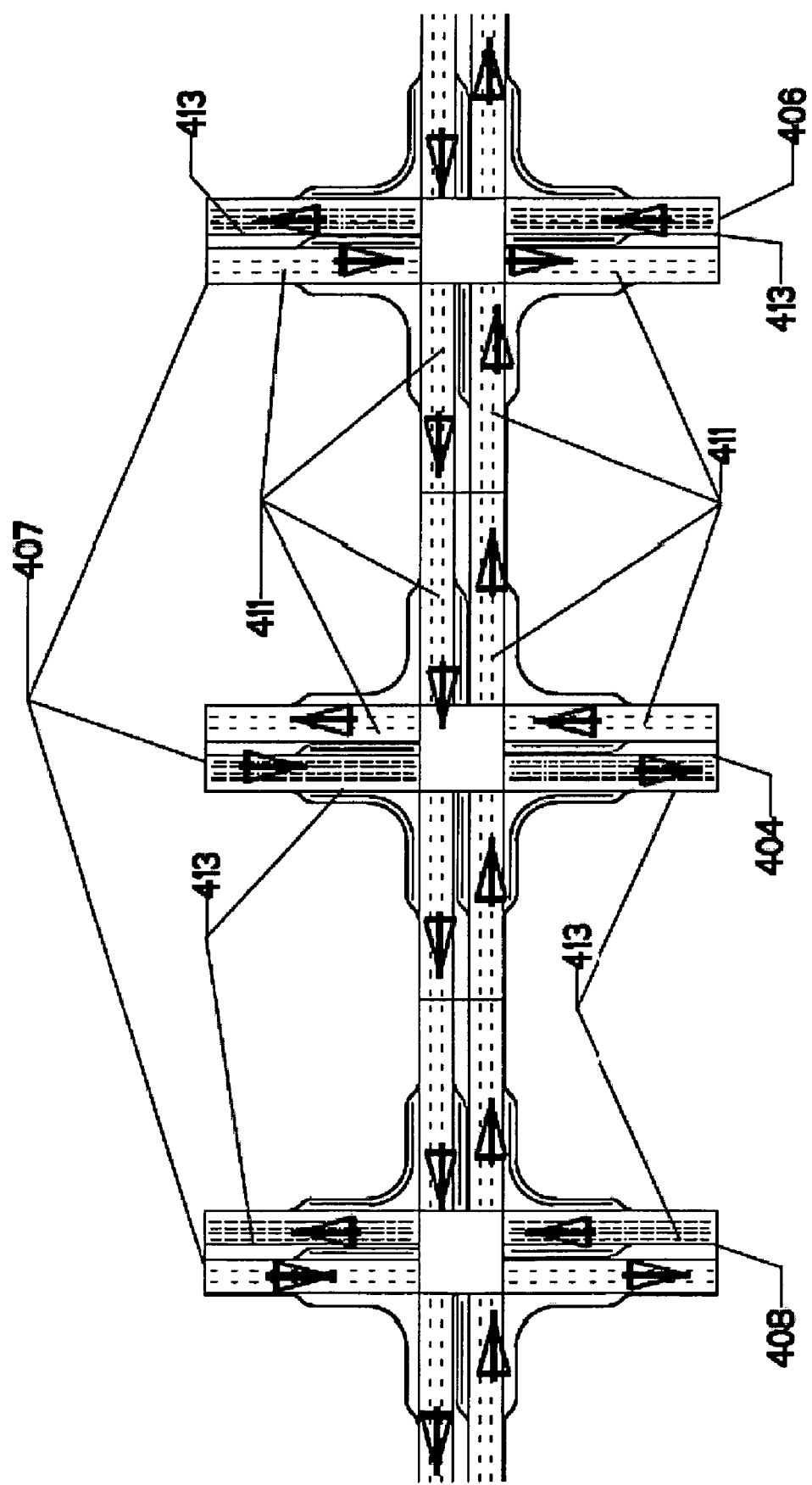
FIG. 5A shows a top view of a 90° intersection of one six-lane normal-width road with three, six-lane parallel local roads having commuter lanes on one side (on the two side roads going from South to North) during morning commuting hours.

FIG. 5A shows a top view of a portion of three intersections of six-lane local roads (the three parallel roads are running North-South with commuter lanes in one direction while the intersecting road is running East-West with no commuter lane). The roads 404, 406, and 408 are a few miles away from each other. As an example, let us assume that there is twice as much traffic demand for south-to-north travel during the morning commute as for north-to-south travel. The commuter traffic flow direction for the road 404 is set opposite to that of the roads 406 and 408. In the morning, four commuter lanes run from north to south and eight commuter lanes (four commuter lanes on each of roads 406 and 408) runs from south to north.

Figure 5B:
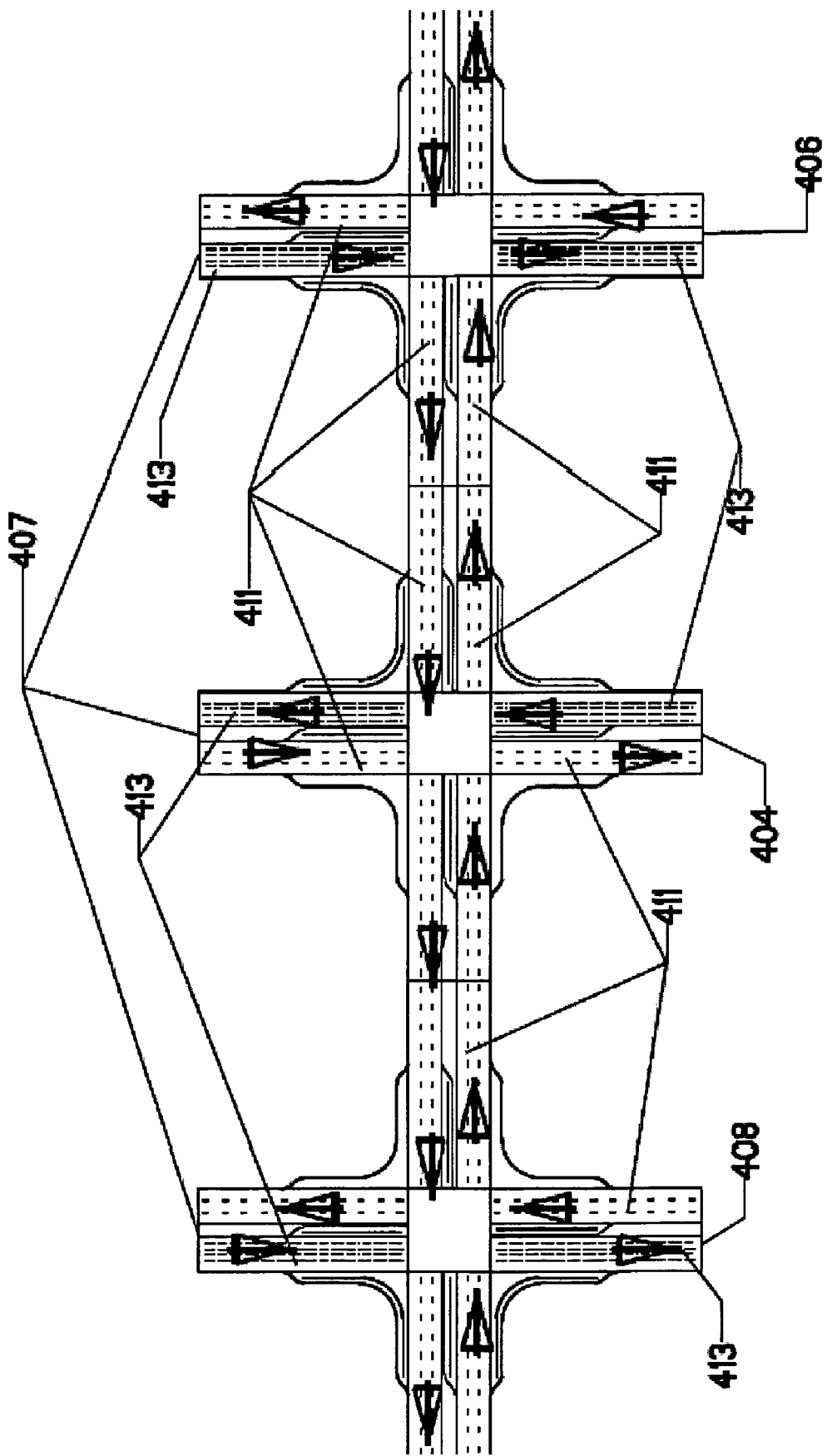
FIG. 5B shows a top view of a 90° intersection of one six-lane normal-width road with three, six-lane parallel local roads having commuter lanes on the other side (on the two side roads going from North to South) during evening commuting hours.

FIG. 5B shows the same roads during the evening commute, with the commute directions reversed. In evening four commuter lanes runs from south to north and eight commuter lanes (four commuter lanes on each of roads 406 and 408) runs from north to south. Any variation of this example can be used depending on the local traffic condition and demand.

Figure 6:
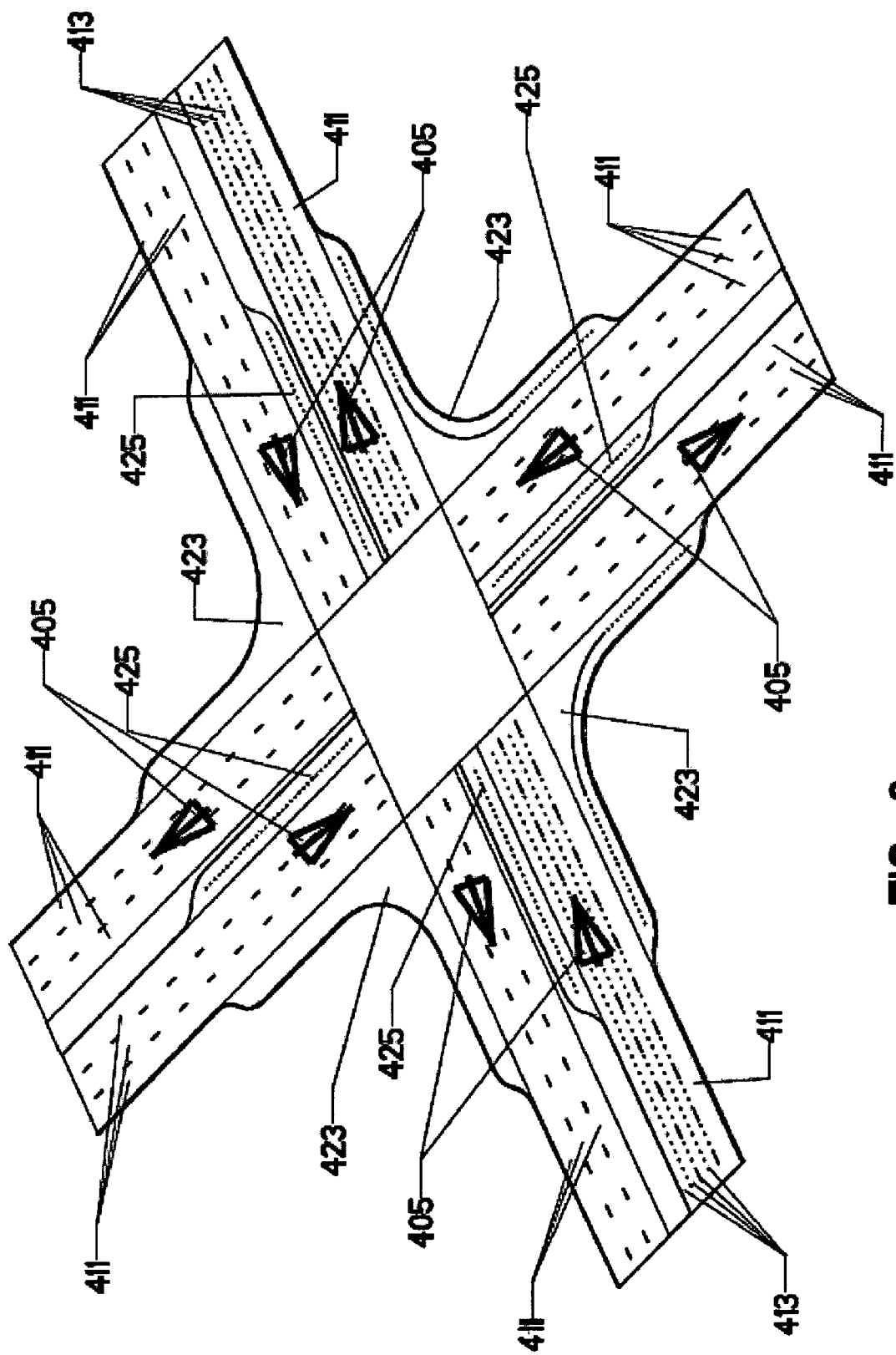
FIG. 6 shows a detailed perspective view of a 90° intersection of one six-lane normal-width road with another six-lane road having four commuter lanes in one direction. It also shows left and right turn bays.

FIG. 6 shows a view of the same road configuration as FIG. 5B, focused on the road 404 intersection, and showing four commuter lanes running south to north during the evening commute. The direction of traffic flow is shown by arrow 405. There are normal-width lanes 411, commuter lanes 413, left turn bays 425 and right turn bays 423. The turn bays should be designed to accommodate at least five to seven mid-size conventional vehicles to maintain smooth and high-speed flow of traffic in the non-turning lanes through the intersections.

Figure 7A:
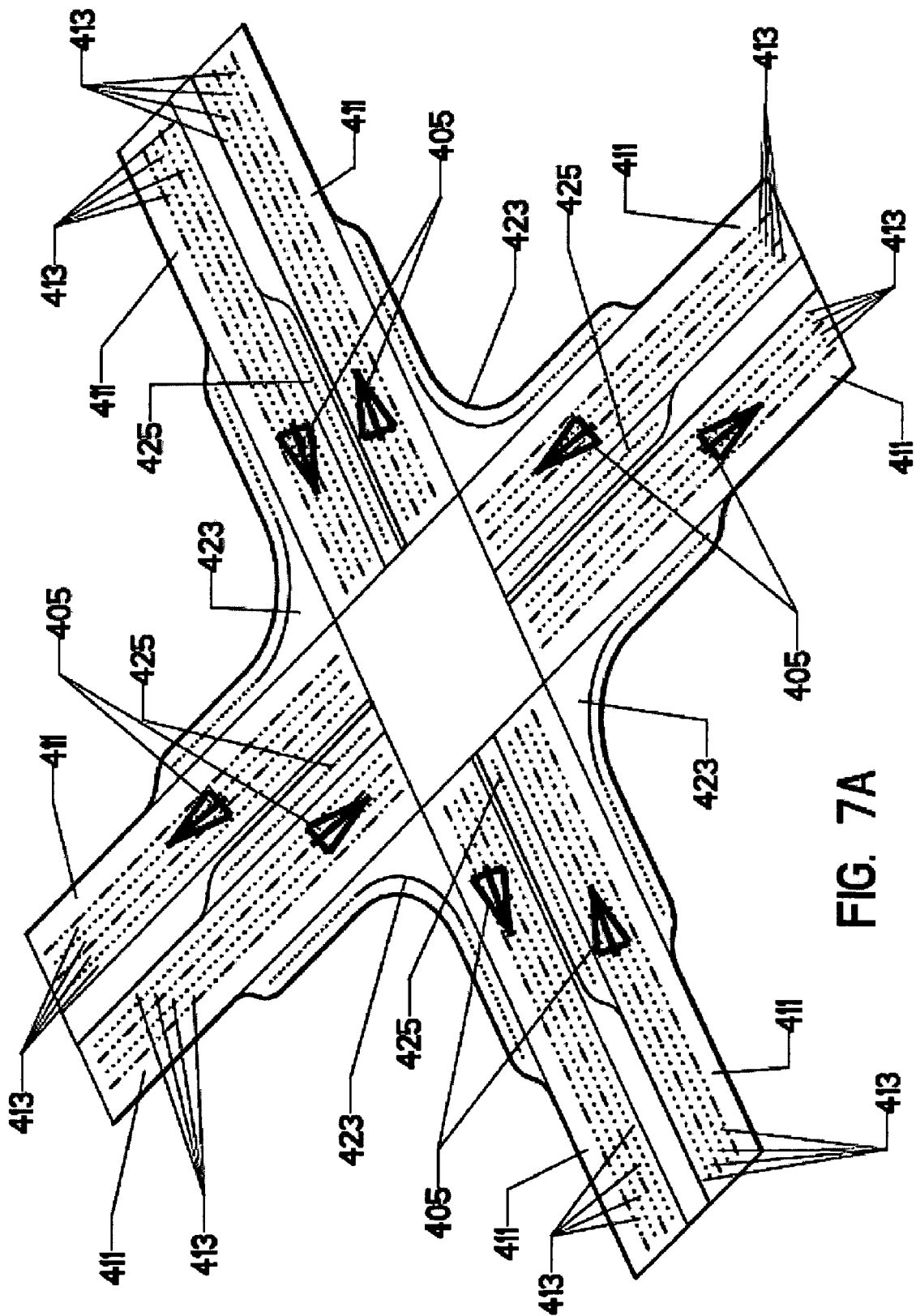
FIG. 7A shows a perspective view of a 90° intersection of roads with four commuter lanes on each side of both roads, with left and right turn bays with commuter lanes. On each side, two normal-width lanes are converted to four six-foot-wide commuter lanes.

FIG. 7A shows a view of a 90° intersection of two local roads each with a capacity of six normal-width lanes 411 configured with four commuter lanes 413 on each side of each road. It also shows left turn bays 425 and right turn bays 423 with commuter lanes. The wait time at such intersection is preferably controlled precisely with a goal of less than 30 sec for non-turning vehicles for all roads.

Figure 7B:
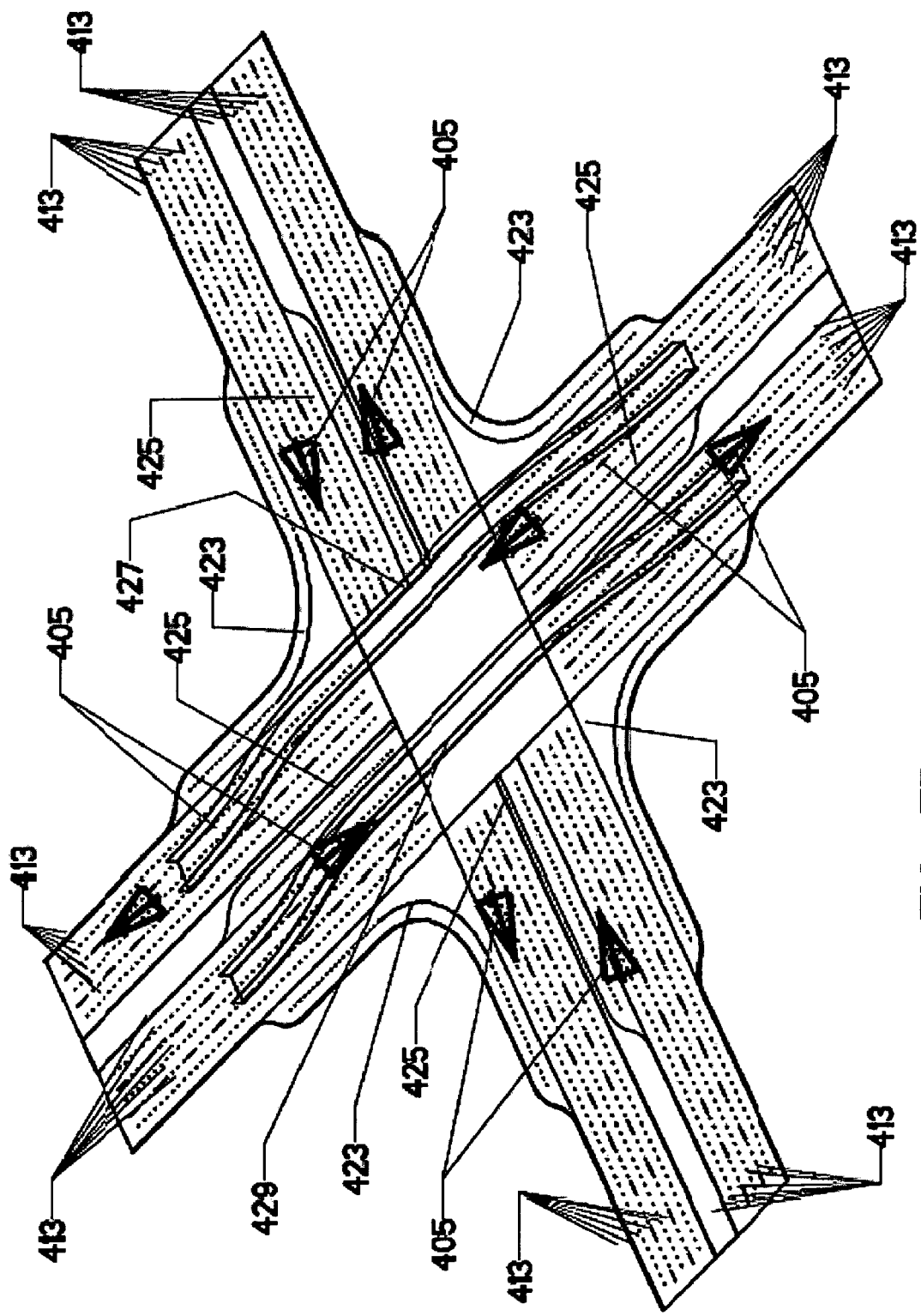
FIG. 7B shows a perspective view of a 90° intersection of roads with six commuter lanes on each side of both roads, with left and right turn bays with commuter lanes. On each side, three normal width lanes are converted to six six-foot-wide commuter lanes. There is also a middle-lane overpass on each side of one road for non-turning commuters.

FIG. 7B shows a view of a 90° intersection of two local roads each with a capacity of six normal-width lanes 411 configured with six commuter lanes 413 on each side of each road. It also shows central lane overpasses 427 and 429 on both sides of one road and turn bays 423 and 425 with commuter lanes. This embodiment has no wait time for non-turning vehicles on the road with the overpass; the busier road should be provided with an overpass on each side. The wait time for the non turning vehicles on the road without the overpass is preferably controlled precisely with a goal of less than 30 sec.

While the figures generally illustrate conversion of six-lane roads, it is understood that the methods can also be applied without limit to roads of any width, and even to one-way roads. Examples are presented for typical American roadways (driving on the right with most vehicles having steering wheels on the left). For roadways in countries, such as those of the former British Commonwealth, where vehicles normally drive on the left and have steering wheels on the right, the same methods can be used with the directions reversed.

In preferred embodiments, commuter lanes can be provided with higher posted speed limits than normal lanes, for example, 70-75 mph on freeways and 50-52 mph on local arterial streets. Commuters know their destinations precisely and higher speed would help to reduce travel time. Commuters are less likely to slow down to figure out which exit to take on freeway or figure out their destination on unfamiliar local roads. Local traffic enforcement agencies including incident management, Department of Transportation, other agencies involved with urban mobility and representatives from local commuters can work together in order to determine critical parameters for managing traffic flow on particular roadways. All parameters for every individual freeway and arterial street need to be determined with local concerns in mind, and all traffic should be closely monitored because of its inherently dynamic nature. As conditions change during the day and from day to day and month to month, the commuter lane configuration can be adjusted to maximize vehicle throughput and minimize commute time.

Peak traffic congestion occurs when there is a significant rise in the rate at which automobiles enter the road system and when that rate exceeds the rate at which automobiles leave the road system. Every individual area or road may have very different peak traffic congestion hours, and these hours are liable to change with time. The *Urban Mobility Report* states that peaks generally occur between 6 am and 10 am and between 4 pm and 7 pm during weekdays, but there are noticeable fluctuations in the level of congestion during these time windows, and these fluctuations are sensitive to the day of the week and the number and timing of abnormal incidents.

The level of congestion can be measured by monitoring the speed of traffic flow if moving, and the number of miles jammed if at a standstill. At a given location, one can monitor the number of lanes blocked and the rate at which vehicle are passing a predetermined point and moving at or above the posted speed limit.

Any freeway or arterial street can be configured to use commuter lanes if it suffers from a noticeable level of congestion that causes extra delay over normal travel time during peak commuting hours. Commuter lanes can be most effectively used on roadways with at least three normal-width lanes on either side, which provides for more flexibility in lane reconfiguration, but it is also possible to use commuter lanes on roadways with fewer lanes. Roadways can typically be configured with normal lanes only during off-peak hours on weekdays and all day on weekends and holidays.

Conversion of particular segments of roadway to use commuter lanes can be cyclic (repeated according to a daily use pattern) and dynamic (responding to changing local conditions). Each selected 12-foot-wide normal-width lane is converted dynamically and cyclically into two 6-foot-wide commuter lanes.

Some roads may require more than just the use of commuter lanes. Any local road or freeway which suffers from an acute level and/or extended period (significantly more than normal commuting hours) of congestion that causes consistently increased delay over normal travel time may require more major redesign and rebuilding. Similarly, if a road has significant slowdown or congestion with minor incidents or even no incident during off-peak hours and/or weekends, then other solutions may be needed. In these cases, there is typically an identifiable cause or causes, which indicate a need to redesign or expand the road, create alternate routes, and/or reconfigure traffic control signals.

In order to take advantage of narrow commuter lanes, the local population must have access to vehicles that are narrow enough to fit the lanes. Any vehicle that is less than approximately 3 ft wide (including projections such as rear-view or side-view mirrors) could be allowed in the commuter lanes. These include vehicles preferably with at-least three wheels (for safety and stability) powered by any energy source. Notwithstanding, new opportunities for designing vehicles specifically to take advantage of commuter lanes are provided by the availability of commuter lanes.

Figure 8A:
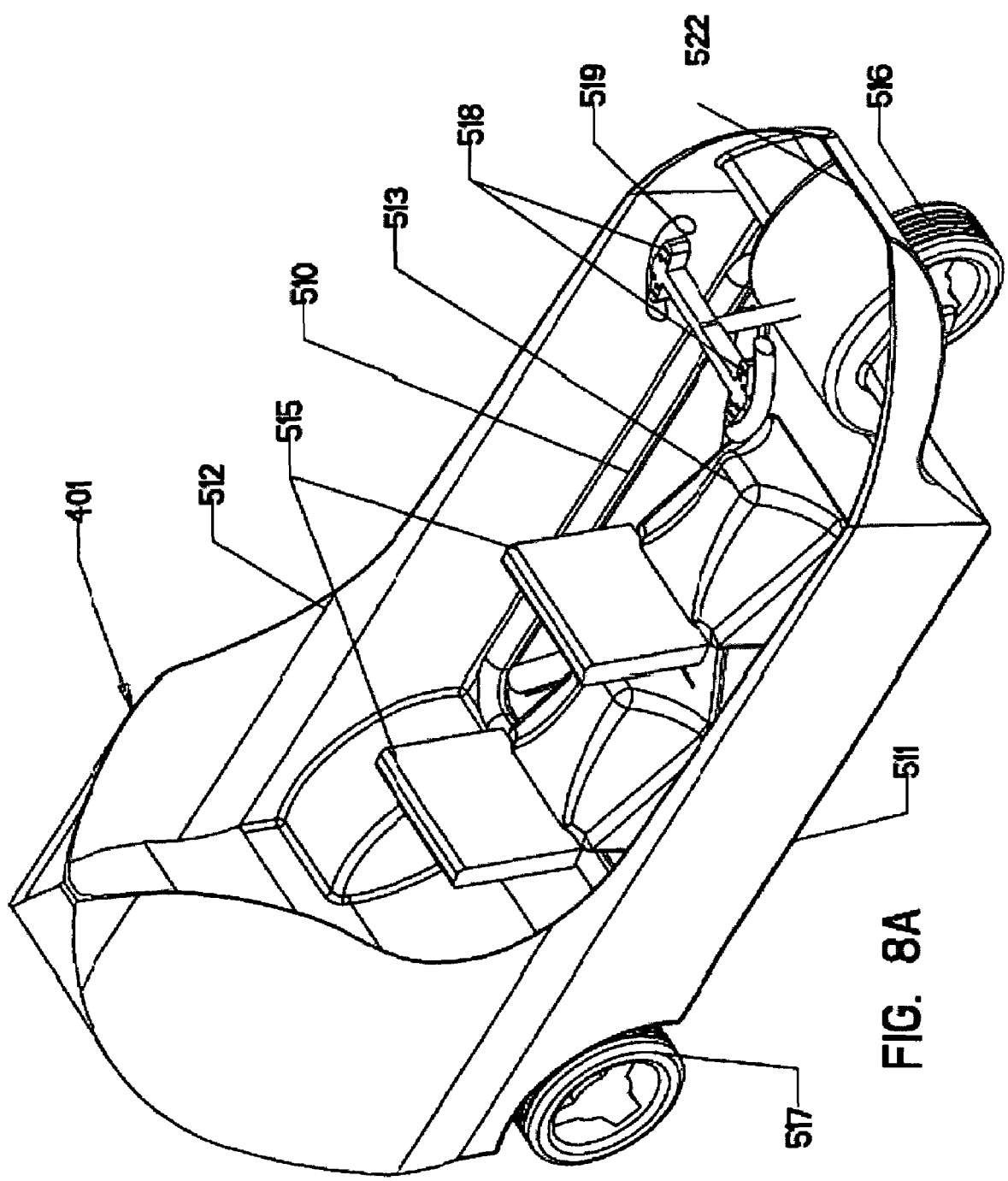
FIG. 8A shows a perspective view of a commuter vehicle without a canopy door.
Figure 9:
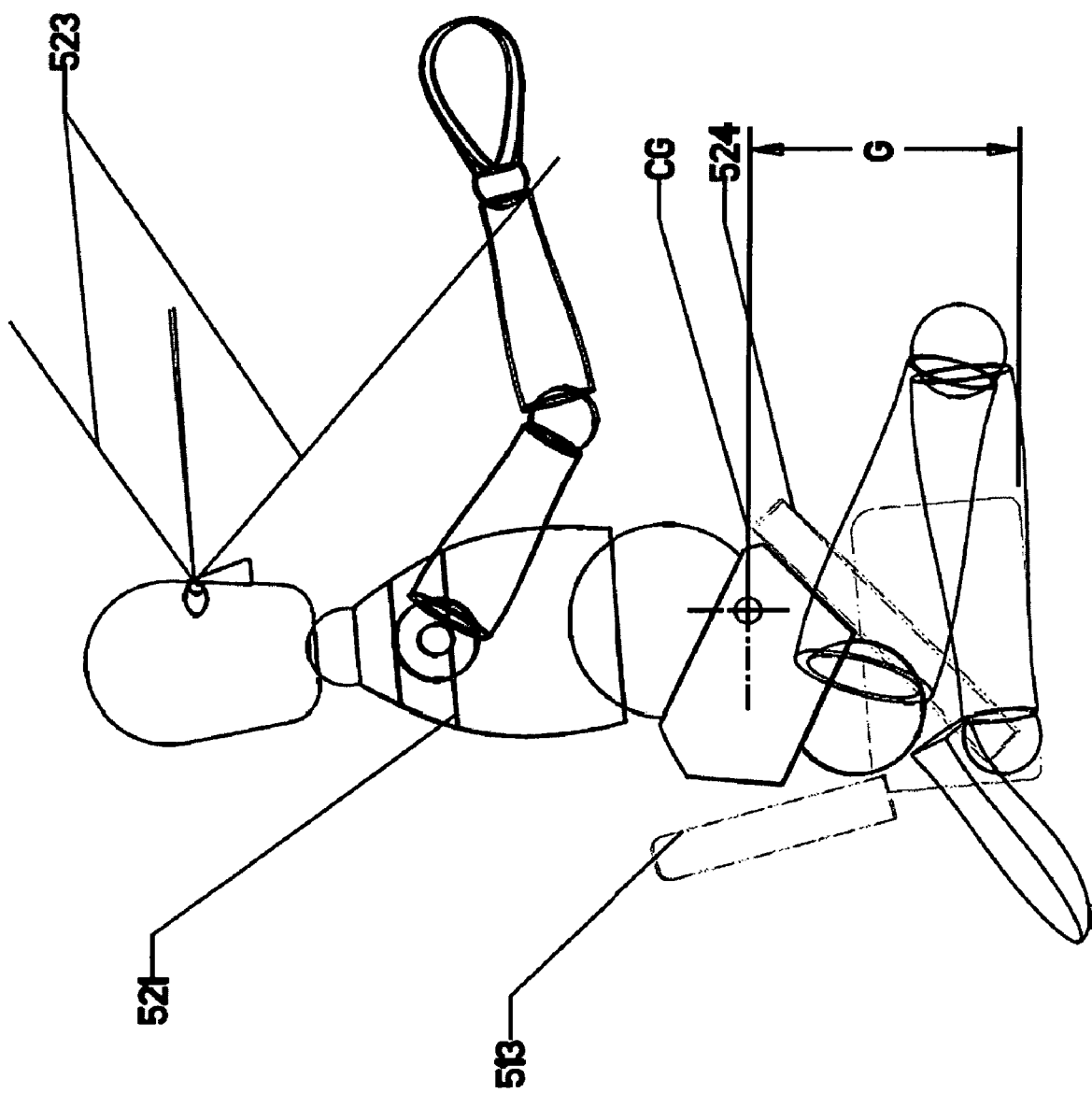
FIG. 9 shows the location of the center of gravity of a human while seating in a near kneeling position.

An example embodiment of such a vehicle is illustrated in FIGS. 8-9. FIG. 8A shows various parts of the vehicle, including a chassis 510 and a body 511. An enclosed cabin 512 can be provided for weather protection, comfort and safety, so a commuter does not have to wear special clothing like motorcycle and scooter riders. The canopy door 514 is shown hinged in front (in alternate embodiments it could be at the back), so that no projection to the side occurs when the canopy door is open or closed, as shown in FIG. 8C. The cabin 512 can have two near-kneeling-position seats 513 one behind the other with height and front-back adjustments. Alternatively, a recumbent seating position (not illustrated) can be used instead of the near-kneeling seating position. In this case, the feet of rear passenger(s) extend to the side of or under the seat of the person in front. The seat can have slideable and tiltable back support 515 and lap restraint belts for safety (FIG. 9). The embodiment shown in FIG. 8A has one front wheel 516 and two rear wheels 517, although other embodiments can have other wheel configurations. The stability of vehicle is ensured by a low overall center of gravity (CG), of for example, about 11 to 13 inches from the ground) plus, in certain embodiments, rear wheel road reaction sensors. If the continuously monitored value of this reaction (torque) is out of predetermined programmed values in the vehicle stability control unit (VSCU), the brakes would be applied automatically to reduce the speed of vehicle. In some embodiments, the vehicle is provided with a unique steering handle or wheel 519. The wheel has all required controls 518 on both sides. All of the controls can be operated by hands only. In one embodiment, the driver must keep both hands on the steering wheel or handle to help force him to pay constant and undivided attention to driving and to stay within the allowed higher speed range for the commuter lanes.

By using the disclosed method and vehicle combination, commuters will have more time available at home. The savings in time for commuting (due to reduced or eliminated traffic congestion) would be up to one hour daily for commuters with 70 to 100 miles round trips. Commuting stress would also be reduced.

FIG. 8B shows side, top, and front views of one embodiment of a commuter vehicle, with dimensions of about 6.75 ft long, 2.75 ft wide, and 4 ft high. The ground clearance J=4.0 in. The compact size, low center of gravity, small engine, and lighter weight results in high road space and fuel consumption efficiency providing low operating and manufacturing cost compared to a conventional automobile.

FIG. 9 shows the center of gravity CG of a human body while seated on the near-kneeling-position seat. For a typical person, the center of gravity is a distance G of about 7.5 in from the vehicle floor. The near-kneeling-position seat (shown in dashed lines) helps to lowering the overall center of gravity of the vehicle. Such a posture provides a significantly lower center of gravity than a conventional automotive or motorcycle seat position.

Space for multiple seats can be providing by adding additional length to body 511. For example, in certain embodiments either two or three seats are provided, one behind the other. Longer configurations are also possible, although two- or three-seat configurations provide a beneficial combination of low manufacturing and operating cost, compactness and efficiency with a small propulsion system sufficient to power the vehicle, a small road footprint, user flexibility, and ride sharing options.

At least one of the wheels 516 and 517 is driven by a propulsion system, which can be, for example, a compact internal combustion engine or rotary combustion engine fueled by gasoline, diesel, or any alternate fuel. Alternatively, other suitable propulsion system may be used, such as an electric motor powered by fuel cells or batteries. An example propulsion system for a two-seat commuter vehicle is an internal combustion engine with about 175-225 cc displacement, producing about 25-30 peak brake horsepower (BHP). Using current engine technology, a commuter vehicle is estimated to get about 100-125 miles per gallon, have a 400-500-mile range with a five-gallon tank, have a top speed about 100 mph, and be able to accelerate from 0 to 60 mph in about 9-11 sec.

A preferred material for the parts more than two feet from the ground is high-strength and lightweight carbon-fiber composite, while the chassis, axles, and seat pan can be made of auto-quality steel, sheet metal, or hollow steel tube. The canopy door can be of polycarbonate which has high impact resistance, good transparency, and is lightweight compared to glass. An air duct can be designed to generate heating and cooling from the ramming effect of air to reduce power use from the engine for heating and cooling. This can provide greater fuel efficiency without sacrificing comfort for the occupant(s). Such heating and cooling can be practical, because these vehicles are rarely expected to be stationary unlike conventional vehicles in heavy commuting traffic.

Operational Characteristics

It is not economically effective to invest huge sums of capital to increase the number of lanes on either side of a freeway, when the existing number of lanes is sufficient during non-peak hours (typically at least 75% of weekdays and 100% of weekends-more than 82% of the time overall). Instead, during peak periods, one or more 12-foot-wide lanes can be converted into two 6-foot-wide "commuter" lanes as shown in FIGS. 1A and B.

The cyclic and dynamic conversion of normal 12-foot-wide lane(s) into commuter lanes will initially be unfamiliar to the drivers of both conventional and commuter vehicles. And, of course, the cyclic and dynamic nature of the conversion means that lane designations will change both cyclically within a day as peak traffic periods occur, and dynamically from day to day as traffic use patterns change. There is thus a need for a clear signal system to alert drivers to the current lane use status. In one embodiment, a set of flashing lights can be used as lane separators, installed on the road in regular patterns 417 and 419 as shown in FIG. 3. The lights can be powered by solar cells (not shown). Very little capital investment is necessary. In certain embodiments, there is a clear distinction between flashing light patterns separating two 6-foot-wide lanes and flashing light patterns between 6-foot-wide lanes and adjacent 12-foot-wide lanes as shown in FIG. 3. In areas with less severe weather, colored flashing lights on medians at predetermined intervals may be sufficient with permanently painted stripes on the road as lane separators for the normal width and commuter lanes. Overhead signs and lights can also be used. In areas where plows are regularly used for snow removal, lights and markers on the road can be flush with, or recessed into the road surface.

In certain embodiments, there can also be a transition zone 421 of suitable length such as one-quarter mile at entry and exit points as shown in FIG. 4. In preferred embodiments, as an additional safety measure, conventional vehicles traveling in the transition zone are required to yield right of way to commuter vehicles crossing to and from commuter lanes for entry and exit. Such transition zones can also be used to indicate the beginning and/or end of commuter lanes. When a transition zone indicates the beginning of commuter lane use, conventional vehicles would be required to leave the lane immediately if the light signals indicate that commuter lanes are in effect.

Due to ever increasing fuel prices, the operating cost and affordability of conventional automobiles during urban peak commuting hours is becoming a problem for many average-income commuters in the United States. Some drivers are switching to non-recreational scooters and motorcycles on local streets and even on freeways. The use of such vehicles has increased substantially, as evidenced by their increased appearance on roadways and sales reports from many dealers and manufacturers in the United States. While these vehicles can be cheaper to operate and reduce congestion, they are also dangerous and provide little protection for the rider. It may be too much of a risk in order to save a little on gasoline. Bad weather increases the risk as well, especially on freeways. One slight mistake on anyone's part can cause an accident with resulting severe injury or death.

The commuter vehicle provides a much higher level of safety, comfort, and survival chances compared to a motorcycle and scooter. Crash ratings can be made comparable to that of conventional automobiles. Commuter vehicles can include safety belts, airbags, antilock brakes, and all the safety features now common in conventional automobiles. Because of the low profile and short height of commuter vehicles, embodiments can also incorporate enhanced visibility features including one or more of bright and fluorescent colors, retroreflective markings, static and flashing lights, poles, and flags. To reduce the aerodynamic drag of any safety feature such as a pole designed to increase the visible height of a commuter vehicle, such a feature can have a low-drag, streamlined shape.

To estimate the effectiveness of the use of commuter vehicles and commuting lanes to decrease travel time and reduce congestion, one can make some model assumptions. First, assume that commuter vehicles replace mid-size sedans on average. The normal mix of commuter traffic includes vehicles ranging from sub-compacts to "full-size" sedans, SUVs, trucks, and the like, but this variability can be ignored for reasonable estimates. The average mid-size sedan is about 15 ft long. In one embodiment, a two-seat commuter vehicle is 6.75 ft long. Two commuter lanes can fit in the space of one normal lane. Thus, for the extreme case of bumper-to-bumper traffic (extreme congestion), road capacity in number of vehicles increases by a factor of 2×15/6.75=4.44 for lanes filled with commuter vehicles instead of conventional vehicles. (Compare to the "throughput ratio" column in Table 2, below.)

Another example of zero-speed vehicle packing occurs for parking. The number of vehicles that can be parked in a given parking lot or alongside a given length of road depends on the particular configuration of marked parking spots. An example of the benefits of commuter vehicles is provided by the observation that four head-in commuter vehicles parking spots can be readily marked in the space of one parallel-parking spot for conventional vehicles.

For moving traffic, drivers must observe suitable safe following distances. Recommendations for safe following distances vary, and actual driving patterns vary even more, but the most common safety recommendation is a two-second interval. At higher speeds, this two-second interval is much more than the vehicle length, and the throughput of a given lane of traffic is limited to about one vehicle every two seconds. Note that this throughput is largely independent of the average traffic speed. The throughput ratio (number of commuter vehicles in commuter lanes per unit time over the number of conventional vehicles per unit time on the same roadway) ranges from close to the stationary bumper-to-bumper vehicle packing ratio of 4.44 at very low speed to about 2.1 for traffic moving at full freeway speeds.

TABLE 2

Improvements in Vehicle Throughput with Commuter Lanes

| Road | Commuter Vehicle Speed [mph] | 2-sec Following Distance [ft] | Commuter Vehicle Throughput [per sec] | Conventional Vehicle Speed [mph] | 2-sec Following Distance [ft] | Conventional Vehicle Throughput [per sec] | Throughput Ratio | Additional Commuter Vehicle Throughput [per hr] |
|---|---|---|---|---|---|---|---|---|
| Both lanes | 0.1 | 0.3 | 0.04 | 0.1 | 0.3 | 0.01 | 4.34 | 115 |
| at same | 5 | 14.7 | 0.68 | 5 | 14.7 | 0.25 | 2.77 | 1575 |
| speed | 25 | 73.3 | 0.92 | 25 | 73.3 | 0.42 | 2.21 | 1802 |
| Arterial | 55 | 161.3 | 0.96 | 30 | 88.0 | 0.43 | 2.25 | 1918 |
| Street | 55 | 161.3 | 0.96 | 35 | 102.7 | 0.44 | 2.20 | 1885 |
|  | 55 | 161.3 | 0.96 | 40 | 117.3 | 0.44 | 2.17 | 1859 |
| Freeway | 75 | 220.0 | 0.97 | 50 | 146.7 | 0.45 | 2.14 | 1860 |
|  | 75 | 220.0 | 0.97 | 55 | 161.3 | 0.46 | 2.12 | 1846 |
|  | 75 | 220.0 | 0.97 | 60 | 176.0 | 0.46 | 2.11 | 1834 |

Additional benefits can also be obtained from increasing the number of occupants per vehicle (by carpooling). This benefit applies with both conventional and commuter vehicles. Most very large metropolitan areas already attempt to encourage carpooling in various ways, providing special carpool parking lots at freeway interchanges and dedicated lanes for high-occupancy vehicles, but on many highways, the majority of vehicles continue to have a single occupant, and a system to improve the throughput of single-occupancy vehicles is needed. However, it is also apparent that commuter vehicles and commuter lanes remain very beneficial as the average number of occupants increases. Two, three-seat commuter vehicles provide more, and more flexible net throughput of people than a carpool using a five-passenger sedan. For example, two three-seat commuter vehicles can accommodate a total of six persons traveling on two different routes and/or at two different times.

While total vehicle and occupant throughput is important, another important benefit of reducing congestion with commuter lanes and commuter vehicles is the reduction in average travel time during peak travel hours. This reduction in travel time results in reductions in lost productivity, reductions in commuting stress, increases in leisure time and family time, and reductions in fuel consumption, benefiting the individual, the local economy, and the environment.

Start-Up Methods

Introducing commuter lanes in a particular urban area requires a small amount of advance planning. A local urban commuter mobility committee can be formed to identify various roads suitable for implementation of commuter lanes. While no major new road-building projects are required, once suitable roads are identified, a suitable set flashing light lane markings, traffic flow monitors, and control systems is installed. The local population is made aware of the new system, and commuter vehicles are made available to drivers to either rent or purchase. New traffic laws may be needed to cover issues of right of way and lane access for vehicles of different types at different times. Traffic management and enforcement personnel are trained to manage the timing of lane conversions, enforce correct usage, and handle abnormal incidents as they occur.

In order to introduce commuter lanes and commuter vehicles to the public, there can be a general awareness campaign in the media about the new lanes and vehicles and their advantages during peak commuting hours. There can be demonstrations during off-peak hours to generate awareness and understanding among commuter and conventional vehicle drivers.

Traffic management personnel can continuously monitor and make changes to the system as traffic patterns vary, while recognizing that it is not desirable to make changes too frequently, so that users of particular roads can become familiar with new daily patterns. However, the performance of the system should be monitored closely, and rules should allow management personnel to be responsive to changing cyclic and dynamic conditions as they occur.

Method for Freeways

1. Identify sections of freeway that have cyclic and dynamic congestion during peak commuting hours;
2. Determine the exact timing for the start and end of the morning and evening peak commuting hours (possibly different for each direction);
3. Install an indicator system (e.g., flashing lights) on the identified freeway sections and a control system to manage the indicators;
4. Provide management infrastructure to make the control system responsive to changing demand (seasonal, special event, weather, accident, etc.);
5. After the peak commuting hours are over, the control system turns off, and the commuter lanes are converted back into normal 12-foot-wide lanes to be shared by remaining commuter vehicles and conventional vehicles on the freeway;
6. The complete daily cycle is repeated each day for both morning and evening peak commuting hours;
7. A quarter-mile transition zone, both for entering and exiting commuter vehicles (to and from commuter lanes) can be provided at both entry and exit points on the freeway; Drivers of conventional vehicles in the transition zone must yield right of way to commuter vehicles entering or exiting commuter lanes to make commuter vehicle entry and exit safe;
8. Management is responsible for the system performance. If performance is unsatisfactory, changes for improvement are proposed and implemented rapidly; incidents of congestion are investigated, and a goal of zero incidents is targeted;
9. Compensation can be provided to commuters who take part in the program; for example, tax breaks can be provided like those that have been offered for buying and using hybrid or alternative fuel vehicles;
10. When a commuter vehicle drivers use a normal-width lane, (for example, before or after the start and/or end of local peak commuting hours or on roads not experiencing congestion), their privileges on the freeway can be similar to that of a motorcycle or scooter rider.

Method for Local Arterial Street
1. Identify any local arterial street with at least three lanes on either side, which experiences cyclic and dynamic congestion during peak commuting hours;
2. Depending on the local traffic demand and availability of roads, design a system of one-way or two-way commuter lanes; any logical variation of commuter lanes, one-way streets, and time-of-day scheduling can be devised to suit local needs;
3. All intersecting streets with commuter lanes can be provided with left and right turn bays to accommodate at least five to seven mid-size conventional vehicles to help in maintaining smooth and high speed flow of traffic for non-turning vehicles through intersections;
4. Install flashing-light lane dividers and the associated control systems on the road segments which are to have commuter lanes;
5. Signal lights at intersections are programmed in such a way that the first and last commuter vehicle, if driven within specified speed range (suggested speed range 50 to 52 mph), would pass seven signals (or other number as suits local conditions—approximately 3 to 4 miles) without encountering a red signal; preferably, the first commuter should not be able to get to the eighth signal before it turns red; there should preferably be a maximum of 30 sec wait on the eighth signal light and then another seven green lights; this should be fine-tuned in order to serve local traffic demand;
6. When two roads with commuter lanes intersect each other, the wait time at signal lights is monitored very precisely;
7. Determine the exact timings for the starting and ending for the morning and evening peak commuting hours;
8. Provide management infrastructure to make the control system responsive to changing demand (seasonal, daylight savings, special event, weather, accident, etc.);
9. After the peak commuting hours are over, the flashing lights are turned off, and the commuter lanes are converted back into normal 12-foot-wide lanes;
10. A transition zone can be provided before the start of left and right turn bays; conventional vehicle drivers must yield right of way to commuter vehicles exiting or entering commuter lanes;
11. Management is responsible for the system performance; if performance is unsatisfactory, changes for improvement are proposed and implemented rapidly; incidents of congestion are investigated, and a goal of zero incidents is targeted;
12. Compensation can be provided to commuters who take part in the program; for example, tax breaks can be provided like those offered for buying and using a hybrid or alternative fuel vehicle;
13. When commuter vehicle drivers are using a normal-width lane, (for example, outside of local peak commuting hours or on roads not experiencing congestion), their privileges on the road can be similar to that of a motorcycle or scooter rider.

Commuter Vehicle

The example embodiment of a commuter vehicle shown in FIGS. 8-9 has many unique features:

Curb weights of about 500 lbs (with two seats) and 650 lbs (with three seats) for better fuel economy and better acceleration with a small motor;

Width of about 2.75 ft or less to fit comfortably in six-foot-wide commuter lanes;

No projections beyond 2.75 ft to ensure clearance from vehicles in adjacent lanes;

Low center of gravity for both vehicle and vehicle-plus-occupants for better stability both at higher speed and during turning;

Front and back near-kneeling position for driver and passenger(s) in order to achieve compact enclosure and take advantage of passenger weight to further lower the overall center of gravity;

Steering handle or wheel with all vehicle controls: accelerator, gear shifter push buttons, brake lever, light, and environmental controls to be operated by hands only;

Engine or motor between the two rear wheels to provide overall compactness and a low-center-of-gravity;

Low ground clearance for low overall center of gravity;

Rear wheel road reaction sensors on both wheels, to avoid tip-over and to maintain stability while taking sharp turns at high speed;

Relatively smaller diameter front and bigger diameter rear wheel for vehicle stability;

Motor or engine with dual mode optimized for high efficiency in the road speed range of 50-52 mph and 70-75 mph for better fuel economy at dominant speeds on local arterial streets and freeways;

At least three road running wheels with front steer-able wheel(s), with centralized braking for all wheels to avoid skidding while braking;

Minimum travel range of 450 to 500 miles to facilitating weekend to weekend fueling for commuters with daily commutes of about 90 miles round trip;

Tire pressure sensor for all tires (unequal tire pressure could contribute to tip-over);

Aerodynamic body profile to achieve drag coefficient of less than 0.25 with low frontal area and low ground clearance for high fuel economy and overall stability.

There can be fully automatic and semi-automatic transmission; both would have all vehicle controls on steering handle or wheel. The fully automatic version can shift gears automatically as on a conventional vehicle with automatic transmission. A semi-automatic can have push buttons for up and down shifting of gears. For both models, all the controls are operated by hand only for drivers in a near-kneeling position. The vehicle can be started and driven like a three wheeled automobile.

Alternative embodiments of commuter vehicles can incorporate variations and additional features. For example, in one embodiment, two wheels in front can be driven by an engine or motor in front and a single rear wheel can be used for steering. A recumbent seating position can be used instead of the near-kneeling seating position. In this case, the feet of rear passenger(s) extend to the side of or under the seat of the person in front. The driver can have conventional pedal controls.

Entering and exiting a commuter vehicle with its low seating position (whether near-kneeling or recumbent) can be facilitated by designing the seats to lift or lower the occupants when the canopy is opened. As a safety precaution, the canopy opening mechanism and seat-lift mechanism can be mechanically or electrically linked so that the canopy door cannot be closed until the seats are fully lowered, and the seats can be lifted only after the canopy door is opened. When the canopy is open, the seats can lift so that the occupants can easily step in or out of the vehicle.

Advantages of Commuter Lanes
  The road capacity increases by a factor of 2-4 (depending on speed) with each normal lane converted into commuter lanes; this conversion can be cyclic and dynamic to reduce or eliminate congestion during peak commuting traffic hours;
  All current highway building technology and manufacturing know-how are sufficient to implement the methods;
  The time required for full implementation could be as low as a few weeks with night working hours only, unlike normal road expansion projects requiring extensive traffic bypasses and temporary blocking of exit and entry points for several months;
  Huge capital savings are possible on various fronts, because roads are not expanded; widening roads for just a few hours per day of peak use becomes unnecessary;
  A small investment to install a flashing-light system is required; no extra space is required on existing roads for implementation of the whole system;
  The time required to install the flashing light system is orders of magnitude less than that required for road expansion;
  The system is flexible; if commuter traffic reduces or shifts time-wise for any reason, system can be quickly modified to adapt to new conditions (increase or reduce the number of commuter lanes or their length or duration);
  If traffic congestion dies completely (say, because of the shutdown of many businesses in the area), commuters can use their commuter vehicles on other roads to go to a new work place; the same flashing light control system could be easily dismantled and reinstalled at a physically new location (unlike railroad and road expansion projects);
  For new road development in urban areas, the flashing light system can be installed during road construction without significant change in construction methods or procedures.

Advantages of Commuter Vehicles
  Dramatically superior in the terms of road space, fuel usage, and travel time compared to a conventional vehicle on same road during peak commuting hours;
  Existing automotive materials, engine technology and manufacturing know-how is sufficient to mass produce complete commuter vehicles;
  Great maneuverability in case congestion does occur as a result of a major accident or incident;
  Parking space economy: four commuter vehicles can be parked in one conventional parking space; low-cost stackable parking structures are also possible due to low vehicle weight;
  No additional or special clothing or rider gear necessary (unlike for motorcycles or scooters);
  Safer then motorcycles and scooters: stable at slow as well as at high speed, and while making turns;
  Safer then motorcycles and scooter in crashes: the occupant does not fall out of the vehicle, there can be lap restraints and airbags;
  Cabin provides weather protection for year-round use like a conventional automobile and unlike a motorcycle or scooter;
  Overpasses and parking structures solely dedicated to commuter vehicles can be much lighter in construction, cheaper, and faster to build that is required for structures built for conventional vehicles.

Accordingly, complete methods to dramatically reduce urban traffic congestion have been provided for both freeways and local arterial streets together with commuter vehicles which improve overall travel time, safety, operating cost, local environment quality, and comfort during commuting. While the methods and vehicles have been described in the context of specific embodiments and examples, many variations are possible within the scope of the invention.

What is claimed is:

1. A method of reducing congestion on a roadway, comprising
  providing a vehicle roadway having at least one normal lane,
  dividing selected lengths of selected normal lanes of said roadway into two commuter lanes, wherein the direction of travel for vehicles in said two commuter lanes is the same as that of the selected normal lane so divided, and wherein conventional vehicles are prohibited from driving in said selected normal lane so divided,
  providing distinctive lane markings to identify said commuter lanes, and
  cyclically, according to a preprogrammed schedule, and dynamically, in response to sensed vehicle traffic volume or unusual events, designating said selected lengths of selected lanes as either normal lanes or pairs of commuter lanes.

2. The method of claim 1, wherein said roadway is a freeway.

3. The method of claim 1, wherein said roadway is a local arterial street.

4. The method of claim 1, wherein said distinctive lane markings comprise flashing lights.

5. The method of claim 1, wherein a control system is provided to perform said dynamic designation in response to signals comprising one or more of vehicle sensors on said roadway, notice of unusual events, weather sensors, and weather condition reports.

6. The method of claim 1, wherein said preprogrammed schedule designates said selected lengths of selected lanes as commuter lanes during certain times and as normal lanes during all other times.

7. The method of claim 1, wherein each of said commuter lanes can support travel fully within each of said commuter lanes by commuter vehicles having a width of about 2.75 ft, for the full length of each of said selected lengths of selected normal lanes, at speeds at least as fast as the normal speed limit for said selected normal lanes.

8. A method of reducing congestion on a roadway, comprising
  providing a vehicle roadway having at least one normal lane,
  dividing selected lengths of selected normal lanes of said roadway into two commuter lanes, wherein said selected normal lanes and said commuter lanes are of substantially constant width, and said dividing results in commuter lanes that are substantially parallel to said selected normal lanes, and wherein conventional vehicles are prohibited from driving in said selected normal lane so divided, providing distinctive lane markings to identify said commuter lanes, and cyclically, according to a preprogrammed schedule, and dynamically, in response to sensed vehicle traffic volume or unusual events such as accidents or weather, designating said selected lengths of selected lanes as either normal lanes or pairs of commuter lanes.

9. The method of claim 8, wherein said roadway is a freeway.

10. The method of claim 8, wherein said roadway is a local arterial street.

11. The method of claim 8, wherein said distinctive lane markings comprise flashing lights.

12. The method of claim 8, wherein a control system is provided to perform said dynamic designation in response to signals comprising one or more of vehicle sensors on said roadway, notice of unusual events, weather sensors, and weather condition reports.

13. The method of claim 8, wherein said preprogrammed schedule designates said selected lengths of selected lanes as commuter lanes during certain times and as normal lanes during all other times.

14. The method of claim 8, wherein each of said commuter lanes can support travel fully within each of said commuter lanes by commuter vehicles having a width of about 2.75 ft, for the full length of each of said selected lengths of selected normal lanes, at speeds at least as fast as the normal speed limit for said selected normal lanes.

15. A method of reducing congestion on a roadway, comprising providing a vehicle roadway having at least one normal lane, dividing selected lengths of selected normal lanes of said roadway into two commuter lanes, wherein the effective vehicle carrying capacity of each of said selected normal lanes is increased by a factor of at least two after said dividing, and wherein conventional vehicles are prohibited from driving in said selected normal lane so divided, providing distinctive lane markings to identify said commuter lanes, and cyclically, according to a preprogrammed schedule, and dynamically, in response to sensed vehicle traffic volume or unusual events such as accidents or weather, designating said selected lengths of selected lanes as either normal lanes or pairs of commuter lanes.

16. The method of claim 15, wherein said roadway is a freeway.

17. The method of claim 15, wherein said roadway is a local arterial street.

18. The method of claim 15, wherein said distinctive lane markings comprise flashing lights.

19. The method of claim 15, wherein a control system is provided to perform said dynamic designation in response to signals comprising one or more of vehicle sensors on said roadway, notice of unusual events, weather sensors, and weather condition reports.

20. The method of claim 15, wherein said preprogrammed schedule designates said selected lengths of selected lanes as commuter lanes during certain times and as normal lanes during all other times.

* * * * *